(12) United States Patent
Hoshino

(10) Patent No.: US 10,790,704 B2
(45) Date of Patent: Sep. 29, 2020

(54) POWER FEEDING SYSTEM AND POWER RECEIVING DEVICE

(71) Applicant: ABLIC Inc., Chiba-shi, Chiba (JP)

(72) Inventor: Masafumi Hoshino, Chiba (JP)

(73) Assignee: ABLIC INC., Chiba (JP)

( * ) Notice: Subject to any disclaimer, the term of this patent is extended or adjusted under 35 U.S.C. 154(b) by 202 days.

(21) Appl. No.: 15/899,768

(22) Filed: Feb. 20, 2018

(65) Prior Publication Data

US 2018/0241253 A1  Aug. 23, 2018

(30) Foreign Application Priority Data

Feb. 22, 2017  (JP) ................. 2017-031437

(51) Int. Cl.
*H02J 50/12* (2016.01)
*H02J 50/60* (2016.01)
*H02J 7/02* (2016.01)

(52) U.S. Cl.
CPC ............ *H02J 50/12* (2016.02); *H02J 7/025* (2013.01); *H02J 50/60* (2016.02)

(58) Field of Classification Search
CPC ........... H02M 3/33523; H02M 1/32; H02M 2001/0032; H02M 3/33507; H02M 1/36; H02M 1/4208; H02M 1/4225; H02M 2001/0006; H02M 2001/0025; H02M 2001/007; H02M 3/07; H02M 3/335; H02M 3/33569; H02M 3/33592; Y02B 70/16; Y02B 70/126; Y02B 70/1475
See application file for complete search history.

(56) References Cited

U.S. PATENT DOCUMENTS

2011/0053500 A1* 3/2011 Menegoli .............. H02J 5/005
  455/41.1
2015/0091387 A1* 4/2015 Okazaki ................ H02J 50/60
  307/104

FOREIGN PATENT DOCUMENTS

JP  2015-070689 A  4/2015

* cited by examiner

*Primary Examiner* — Rexford N Barnie
*Assistant Examiner* — Elim Ortiz
(74) *Attorney, Agent, or Firm* — Brinks Gilson & Lione

(57) ABSTRACT

A power feeding system includes a power feeding device and a power receiving device. The power receiving device includes: a resonant circuit having: a receiving coil; a resonant capacitor; and a resonance control transistor; and a resonance control unit configured to control the resonance control transistor based on received power by the receiving coil and power consumption of the load, and to control the resonance control transistor to keep the resonant circuit in a non-resonant state when the power consumption of the load becomes equal to or less than a predetermined value. The power feeding device includes a drive control unit configured to determine whether or not power supply to the power receiving device is required based on a periodic waveform variation in an excited voltage excited in the feeding coil.

7 Claims, 10 Drawing Sheets

US 10,790,704 B2

POWER FEEDING SYSTEM AND POWER RECEIVING DEVICE

RELATED APPLICATIONS

This application claims priority under 35 U.S.C. § 119 to Japanese Patent Application No. 2017-031437 filed on Feb. 22, 2017, the entire content of which is hereby incorporated by reference.

BACKGROUND OF THE INVENTION

1. Field of the Invention

The present invention relates to a power feeding system, a power receiving device, and a power feeding method.

2. Description of the Related Art

In recent years, there has been known a power feeding system configured to supply electric power wirelessly through electromagnetic induction or electromagnetic coupling between a feeding coil and a receiving coil (see, for example, Japanese Patent Application Laid-open No. 2015-70689).

In the power feeding system described in Japanese Patent Application Laid-open No. 2015-70689, a power receiving device has a resonant circuit having a receiving coil, a resonant capacitor, and a resonance control transistor configured to control a resonant state, and a power feeding device is configured to detect a change in resonant state of the power receiving device as a periodic waveform variation in an excited voltage excited in the feeding coil. The power feeding device is configured to determine whether or not the power supply to the power receiving device is required based on the detected periodic waveform variation.

In the above-mentioned power feeding system, there may be a case in which a load connected to the power receiving device is in a state of a low power consumption, for example, a case in which the load is a rechargeable battery that has been fully charged. In this case, in the above-mentioned power feeding system, the resonant circuit of the power receiving device is fixed to a non-resonant state. As a result, the periodic waveform variation in the excited voltage excited in the feeding coil is not detected, and the power feeding device determines that power supply to the power receiving device is not permitted.

However, in the above-mentioned power feeding system, for example, when a coupling coefficient between the feeding coil and the receiving coil is low, the electric power supplied from the power feeding device to the power receiving device decreases. Consequently, the power consumption of the power receiving device cannot be ensured under a state in which the resonant circuit is fixed to the non-resonant state, and the resonant circuit of the power receiving device may be controlled to the resonant state. In this case, the periodic waveform variation in the excited voltage excited in the feeding coil is detected, and the power feeding device may thus erroneously determine that power supply to the power receiving device is required although the power supply is not required.

SUMMARY OF THE INVENTION

An object of the present invention is to provide a power feeding system, a power receiving device, and a power feeding method that are capable of reducing the risk of an erroneous determination about whether or not power supply to the power receiving device is required.

According to one embodiment of the present invention, there is provided a power feeding system comprising: a power feeding device having a feeding coil; and a power receiving device having a receiving coil and is connected to a load, the power feeding system being configured to supply electric power from the power feeding device to the power receiving device through electromagnetic induction, the power receiving device comprising: a resonant circuit having: the receiving coil configured to receive the electric power from the feeding coil; a resonant capacitor configured to resonate with the receiving coil; and a first switching element configured to control a resonant state by changing an electrical connection state of the resonant capacitor; and a resonance control unit configured to control the first switching element based on received power by the receiving coil and power consumption of the load to which the received power is supplied, and to control the first switching element so that the resonant circuit is kept in a non-resonant state when the power consumption of the load becomes equal to or lower than a predetermined value, the power feeding device comprising: a second switching element connected in series to the feeding coil and periodically switched between a conductive state and a non-conductive state with a drive signal for driving the feeding coil; and a drive control unit configured to determine whether or not supply of the electric power to the power receiving device is required based on a periodic waveform variation in an excited voltage excited in the feeding coil which is detected from the change in electrical connection state of the resonant capacitor, and to control whether or not to continue supply of the drive signal to the second switching element.

Further, according to one embodiment of the present invention, there is provided a power receiving device configured to receive electric power from a power feeding device through electromagnetic induction, and is connected to a load, the power feeding device being configured to determine whether or not power supply to the power receiving device is required based on a periodic waveform variation in an excited voltage excited in a feeding coil, and to control whether or not to continue supply of a drive signal for driving the feeding coil from a result of the determination, the power receiving device comprising: a resonant circuit having: a receiving coil configured to receive the electric power from the feeding coil; a resonant capacitor configured to resonate with the receiving coil; and a switching element configured to control a resonant state by changing an electrical connection state of the resonant capacitor; and a resonance control unit configured to control the switching element based on received power by the receiving coil and power consumption of the load to which the received power is supplied, and to control the switching element so that the resonant circuit is kept in a non-resonant state when the power consumption of the load becomes equal to or lower than a predetermined value.

Further, according to one embodiment of the present invention, there is provided a power feeding method for a power feeding system, the power feeding system comprising a power feeding device and a power receiving device, the power feeding system being configured to supply electric power from the power feeding device to the power receiving device through electromagnetic induction, the power receiving device comprising: a resonant circuit having: a receiving coil configured to receive the electric power from a feeding coil; a resonant capacitor configured to resonate with the receiving coil; and a first switching element configured to perform switching between a resonant state and a non-resonant state by changing an electrical connection state of the resonant capacitor, the power receiving device being connected to a load, the power feeding device having the feeding coil, the power feeding method comprising: supplying a drive signal for driving the feeding coil to a second switching element connected in series to the feeding coil from the power feeding device by periodically switching the second switching element between a conductive state and a non-conductive state; controlling the first switching element from the power receiving device based on the received power by the receiving coil and power consumption of the load to which the received power is supplied, and further controlling the first switching element so that the resonant circuit is kept in a non-resonant state when the power consumption of the load becomes equal to or lower than a predetermined value; and determining in the power feeding device whether or not supply of the electric power to the power receiving device is required based on a periodic waveform variation in an excited voltage excited in the feeding coil which is detected from the change in electrical connection state of the resonant capacitor, and to control whether or not to continue supply of the drive signal to the second switching element from a result of the determination.

According to the present invention, it is possible to reduce the risk of an erroneous determination about whether or not power supply to the power receiving device is required.

DETAILED DESCRIPTION OF THE EMBODIMENTS

Now, a power feeding system according to one embodiment of the present invention is described with reference to the drawings.

Figure 1:
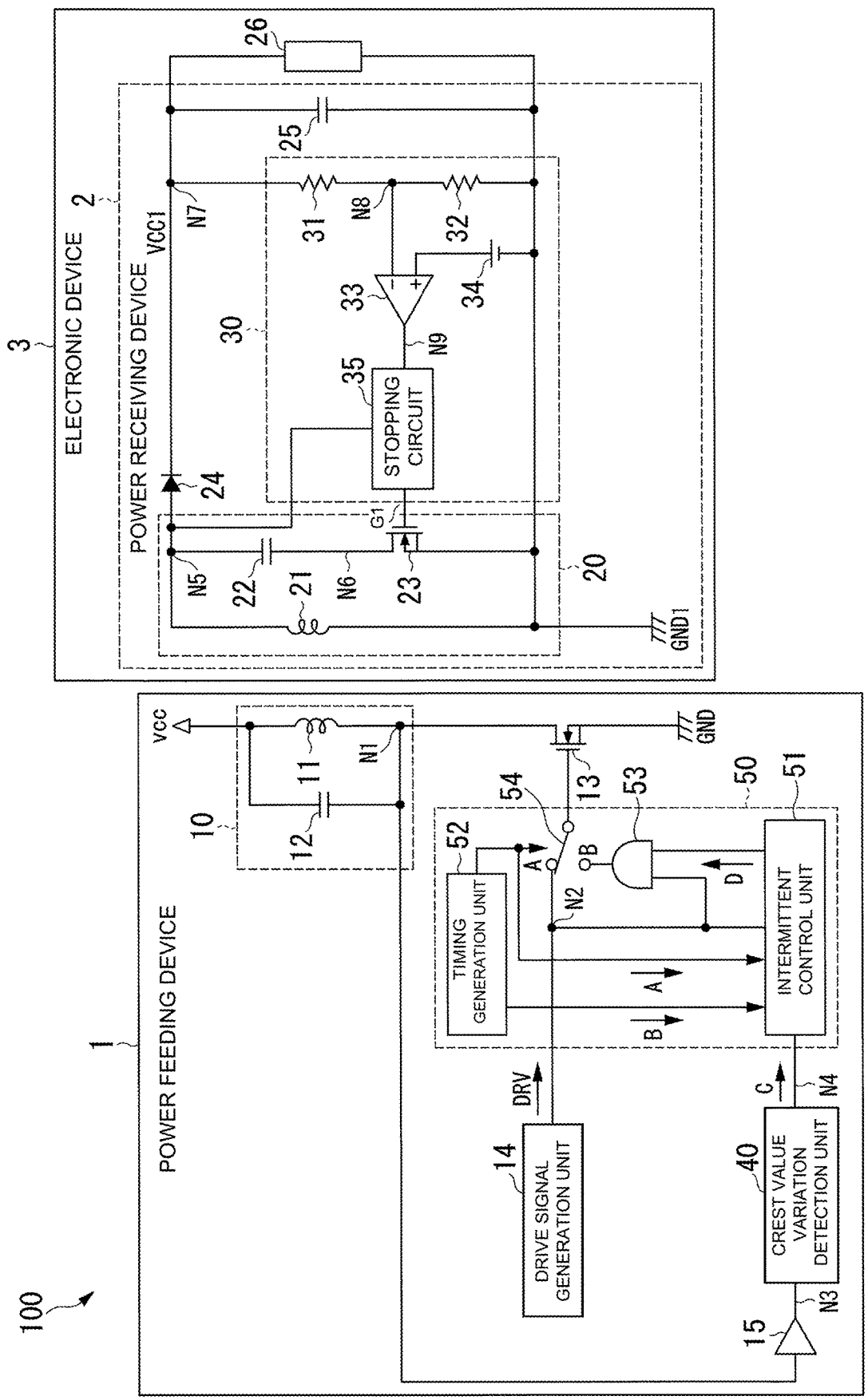
FIG. 1 is a block diagram for illustrating an example of a power feeding system according to an embodiment of the present invention.

FIG. 1 is a block diagram for illustrating an example of a power feeding system 100 according to the embodiment of the present invention.

As illustrated in FIG. 1, the power feeding system 100 has a power feeding device 1 and an electronic device 3 having a power receiving device 2.

The power feeding system 100 is a system configured to supply electric power from the power feeding device 1 to the power receiving device 2 wirelessly (in a non-contact manner). For example, the power feeding system 100 is configured to supply electric power for operating a load 26 included in the power receiving device 2 from the power feeding device 1 to the power receiving device 2.

The electronic device 3 is, for example, a mobile phone terminal or a personal digital assistant (PDA), and has the power receiving device 2 and the load 26. Further, the power feeding device 1 is, for example, a charger compatible with the power receiving device 2.

<Configuration of Power Feeding Device 1>

The power feeding device 1 has a feeding coil 11, a resonant capacitor 12, a drive transistor 13, a drive signal generation unit 14, a buffer 15, a crest value variation detection unit 40, and a drive control unit 50.

The feeding coil 11 has a first terminal connected to a VCC terminal, and a second terminal connected to a node N1. The feeding coil 11 is a coil configured to supply electric power to a receiving coil 21 included in the power receiving device 2 through, for example, electromagnetic induction or electromagnetic coupling. For supplying electric power to the load 26, the feeding coil 11 is arranged to be opposed to the receiving coil 21 to supply electric power to the receiving coil 21 through electromagnetic induction.

The resonant capacitor 12 is a capacitor that is connected in parallel to the feeding coil 11, and is configured to resonate with the feeding coil 11. The feeding coil 11 and the resonant capacitor 12 form a resonant circuit 10. The resonant circuit 10 is configured to resonate at a predetermined resonant frequency (for example, 100 kHz (kilohertz)) determined by an inductance value of the feeding coil 11 and a capacitance value of the resonant capacitor 12.

The drive transistor 13 (second switching element) is, for example, a field effect transistor (FET), and is connected in series to the resonant circuit 10. In this embodiment, the case in which the drive transistor 13 is an N-channel metal oxide semiconductor (MOS) FET is described as an example. In the following, "MOSFET" is sometimes referred to as a MOS transistor, and "N-channel MOS transistor" is sometimes referred to as an NMOS transistor.

Specifically, the drive transistor 13 has a source terminal connected to a GND terminal, a gate terminal connected to an output signal line of the drive control unit 50, and a drain terminal connected to the node N1. The drive transistor 13 is controlled by the drive control unit 50 to periodically repeat an ON state (conductive state) and an OFF state (non-conductive state). In other words, the supply and release of electric power to and from the resonant circuit 10 are repeated by the switching operation of the drive transistor 13, generating a periodic signal in the feeding coil 11, and electric power is supplied from the feeding coil 11 to the receiving coil 21 through electromagnetic induction.

The drive signal generation unit 14 is configured to generate a drive signal DRV for driving the feeding coil 11. As used herein, the drive signal DRV is a signal for periodically switching the drive transistor 13 between the ON state (conductive state) and the OFF state (non-conductive state). In other words, the drive signal generation unit 14 is configured to generate the drive signal DRV for periodically controlling the ON state/OFF state of the drive transistor 13.

The buffer 15 is an output circuit configured to output a voltage signal equal to an input signal, and is, for example, a voltage follower circuit. The buffer 15 has an input terminal connected to the node N1 and an output terminal connected to a node N3. In other words, the buffer 15 outputs a voltage of the feeding coil 11 (voltage of the node N1 on the feeding coil 11 side) to the crest value variation detection unit 40.

The crest value variation detection unit 40 (variation detection unit) is configured to detect a change in resonant state of a resonant circuit 20 of the power receiving device 2 which occurs in relation to a connection state of a resonant capacitor 22 of the power receiving device 2 to be described later, as a periodic waveform variation in an excited voltage which is excited in the feeding coil 11. The periodic waveform variation has, for example, a variation in peak voltage of the excited voltage. In this embodiment, there is described a case in which the crest value variation detection unit 40 is configured to detect the change in resonant state of the resonant circuit 20 of the power receiving device 2 as the variation in peak voltage of the excited voltage which is excited in the feeding coil 11.

As described in detail later, the power receiving device 2 is configured to control the resonant circuit 20 of the power receiving device 2 to be switched between the resonant state and a non-resonant state. The periodic waveform of the excited voltage excited in the feeding coil 11 varies depending on whether or not the resonant circuit 20 of the power receiving device 2 is in the resonant state. Accordingly, the crest value variation detection unit 40 is configured to detect a change (variation) in peak voltage of the voltage waveform output from the buffer 15 which corresponds to the voltage (excited voltage) of the feeding coil 11, and output a result of the detection to a node N4 as a detection signal C. For example, the crest value variation detection unit 40 outputs a pulse signal of a high state (H state) when the variation in peak voltage of the voltage of the feeding coil 11 is detected. For example, when the variation in peak voltage of the voltage of the feeding coil 11 is not detected, the crest value variation detection unit 40 does not output a pulse signal but keeps a low state (L state). The detailed configuration of the crest value variation detection unit 40 is described later with reference to FIG. 2.

The drive control unit 50 is configured to perform control to supply the drive signal DRV generated by the drive signal generation unit 14 to the drive transistor 13. The drive control unit 50 is configured to determine whether or not power supply to the power receiving device 2 is required based on the periodic waveform variation in the excited voltage excited in the feeding coil 11 which is detected from a change in electrical connection state of the resonant capacitor 22, and control whether or not to continue the supply of the drive signal to the drive transistor 13 from a result of the determination. Specifically, the drive control unit 50 is configured to determine based on the variation in peak voltage detected by the crest value variation detection unit 40 whether or not power supply to the power receiving device 2 is required (electric power can be supplied to the power receiving device 2), and control whether or not to continue the supply of the drive signal DRV to the drive transistor 13 from a result of the determination.

For example, when it is determined that power supply to the power receiving device 2 is required (electric power can be supplied to the power receiving device 2), the drive control unit 50 continues the supply of the drive signal DRV, thereby performing continuous drive for continuously driving the feeding coil 11. Meanwhile, for example, when it is determined that power supply to the power receiving device 2 is not required (electric power cannot be supplied to the power receiving device 2), the drive control unit 50 stops the supply of the drive signal DRV, thereby intermittently (non-continuously) driving the feeding coil 11 for intermittent drive.

The case in which power supply to the power receiving device 2 is not required corresponds to, for example, a case in which the load 26 is a rechargeable battery, and the supply of electric power from the power feeding device 1 is no longer required due to full charging. In this case, the load 26 is in a low power consumption state (light load state). Further, the case in which power supply to the power receiving device 2 is not required may include the case in which electric power cannot be supplied to the power receiving device 2. Here, the case in which electric power cannot be supplied to the power receiving device 2 corresponds to, for example, a case in which there is no power receiving device 2 (also including a case in which the feeding coil 11 and the receiving coil 21 are not located at appropriate positions) and a case in which a metallic foreign object is placed on the feeding coil 11.

Specifically, for example, the drive control unit 50 supplies the drive signal DRV to the drive transistor 13 in a preset detection period (first period), and causes the crest value variation detection unit 40 to detect the variation in peak voltage. Then, when it is determined in this detection period that power supply to the power receiving device 2 is required, the drive control unit 50 continues the supply of the drive signal DRV to the drive transistor 13 for a preset power supply period (second period) after the detection period, to thereby continuously drive the feeding coil 11. When it is determined in this detection period that power supply to the power receiving device 2 is not required, the drive control unit 50 stops the supply of the drive signal DRV to the drive transistor 13 in the power supply period after the detection period, to thereby intermittently drive the feeding coil 11.

The drive control unit 50 has an intermittent control unit 51, a timing generation unit 52, an AND circuit 53, and a switching unit 54.

The intermittent control unit 51 is configured to control the switching between the continuous drive of the feeding coil 11 and the intermittent drive of the feeding coil 11 described above based on a signal A and a signal B that are timing signals generated by the timing generation unit 52 and the detection signal C of the crest value variation detection unit 40. For example, when power supply to the power receiving device 2 is required, the intermittent control unit 51 sets its output signal D to the H state to continuously supply the drive signal DRV to the drive transistor 13. For example, when electric power cannot be supplied to the power receiving device 2, the intermittent control unit 51 sets the output signal D to the L state to stop the supply of the drive signal DRV to the drive transistor 13.

The timing generation unit 52 is configured to generate the above-mentioned detection period (first period) and power supply period (second period) alternately and regularly. Specifically, the timing generation unit 52 generates the signal A and the signal B that are the timing signals for generating the detection period and the power supply period, and outputs the generated signals A and B to the intermittent control unit 51 and the switching unit 54. The details of the signal A and the signal B are described later.

The AND circuit 53 is an operational circuit configured to implement AND logical operation (logical conjunction) on two input signals, and is configured to, based on the output signal D (drive control signal) of the intermittent control unit 51, control whether or not to supply the drive signal DRV to the drive transistor 13 via the switching unit 54.

The switching unit 54 is, for example, a selector circuit configured to select and output one of a terminal-A (node N2) input and a terminal-B input based on a control signal. Based on the signal A output from the timing generation unit 52, the switching unit 54 outputs the terminal-A input (drive signal DRV) or the terminal-B input (output of the AND circuit 53) to the gate terminal of the drive transistor 13.

For example, when the signal A is in the L state, the switching unit 54 outputs the terminal-A input (drive signal DRV) to the gate terminal of the drive transistor 13. When the signal A is in the H state, the switching unit 54 outputs the terminal-B input (output of the AND circuit 53) to the gate terminal of the drive transistor 13.

<Configuration of Power Receiving Device 2>

The power receiving device 2 has the receiving coil 21, the resonant capacitor 22, a resonance control transistor 23, a rectifying diode 24, a smoothing capacitor 25, and a resonance control unit 30. Further, the power receiving device 2 is configured to supply electric power received from the power feeding device 1 to the load 26.

The receiving coil 21 has a first terminal connected to a node N5, and a second terminal connected to a GND1 terminal. The receiving coil 21 is a coil supplied with electric power from the feeding coil 11 included in the power feeding device 1 through, for example, electromagnetic induction or electromagnetic coupling. For supplying electric power to the load 26, the receiving coil 21 is arranged to be opposed to the feeding coil 11.

The resonant capacitor 22 is a capacitor that is connected in parallel to the receiving coil 21, and is configured to resonate with the receiving coil 21. The resonant capacitor 22 is connected between the node N5 and a node N6.

The receiving coil 21, the resonant capacitor 22, and the resonance control transistor 23 form the resonant circuit 20. The resonant circuit 20 is configured to resonate at a predetermined resonant frequency (for example, 100 kHz) determined by an inductance value of the receiving coil 21 and a capacitance value of the resonant capacitor 22. In this embodiment, the resonant frequency of the power receiving device 2 and the resonant frequency of the power feeding device 1 are equal to each other, for example, 100 kHz.

The resonance control transistor 23 (example of a first switching element) is a switching element configured to switch the resonant circuit 20 between the resonant state and the non-resonant state by changing an electrical connection state of the resonant capacitor 22. The resonance control transistor 23 is connected in parallel to the receiving coil 21 together with the resonant capacitor 22, and is connected in series to the resonant capacitor 22. The resonance control transistor 23 is, for example, an NMOS transistor, and has a source terminal connected to the GND1 terminal, and a drain terminal connected to the node N6. The resonance control transistor 23 has a gate terminal connected to an output signal line of the resonance control unit 30 to be described later. The ON state of the resonance control transistor 23 caused by the resonance control unit 30 activates the resonant capacitor 22 to resonate the resonant circuit 20. The OFF state of the resonance control transistor 23 caused by the resonance control unit 30 disconnects the resonant capacitor 22 to stop the resonance of the resonant circuit 20.

The rectifying diode 24 (rectifier unit) has an anode terminal connected to the node N5 corresponding to one terminal of the receiving coil 21, and a cathode terminal connected to a node N7 corresponding to one terminal of the smoothing capacitor 25. The rectifying diode 24 is configured to rectify electric power received by the receiving coil 21, and convert the rectified electric power into DC electric power. Specifically, the rectifying diode 24 is configured to convert AC electric power (AC voltage) generated in the receiving coil 21 into DC electric power (DC voltage), to thereby supply electric power to the load 26.

The smoothing capacitor 25 is configured to smooth the DC electric power obtained through the conversion by the rectifying diode 24.

The load 26 is, for example, various circuits, a drive unit, or a circuit configured to charge a rechargeable battery or a secondary battery included in the electronic device 3, and is operated or charged with a DC voltage rectified by the rectifying diode 24. The load 26 may be, for example, a system using a microcomputer, a power supply circuit of the system, an audio amplifier, a radio circuit, a sensor circuit, an illumination drive circuit, or a display circuit.

The resonance control unit 30 is configured to control the resonant state of the resonant circuit 20 by controlling the resonance control transistor 23. The resonance control unit 30 is configured to control the resonance control transistor 23 based on received power by the receiving coil 21 from the feeding coil 11, and power consumption of the load 26 that is supplied with the received power. The resonance control unit 30 is configured to control the resonance control transistor 23, for example, based on a voltage of a supply line (voltage of the node N7) through which the received power by the receiving coil 21 and rectified, is supplied to the load 26. The voltage of the supply line (voltage of the node N7) varies depending on the received power and the power consumption of the load 26. Therefore, the control of the resonance control transistor 23 based on the voltage of the supply line (voltage of the node N7) is an example of the control of the resonance control transistor 23 based on the received power and the power consumption of the load 26.

The resonance control unit 30 is configured to control the resonance control transistor 23 so that the resonant circuit 20 is set to the non-resonant state, for example, when the voltage of the supply line (voltage of the node N7) is equal to or more than a predetermined threshold value. Meanwhile, the resonance control unit 30 is configured to control the resonance control transistor 23 so that the resonant circuit 20 is set to the resonant state, for example, when the voltage of the supply line (voltage of the node N7) is less than the predetermined threshold value.

Further, the resonance control unit 30 is configured to control the resonance control transistor 23 so that the resonant circuit 20 is kept in the non-resonant state when the power consumption of the load 26 becomes equal to or less than a predetermined value. The resonance control circuit 30 is configured to control the resonance control transistor 23 so that the resonant circuit 20 is kept in the non-resonant state, for example, when a non-resonant period in which it is continuously determined that the resonant circuit 20 is to be set to the non-resonant state is equal to or more than a predetermined period.

Further, the resonance control unit 30 has a resistor 31, a resistor 32, a comparator 33, a reference power supply 34, and a stopping circuit 35.

The resistor 31 has a first terminal connected to the node N7, and a second terminal connected to a node N8. Further, the resistor 32 has a first terminal connected to the node N8, and a second terminal connected to the GND1 terminal. The resistor 31 and the resistor 32 are connected in series between the node N7 and the GND1 terminal. Through the resistor 31 and the resistor 32, a voltage which is obtained by decreasing the voltage of the node N7 by voltage division at a ratio between resistance values of the resistor 31 and the resistor 32, is output to the node N8.

The comparator 33 (example of a resonance determination unit) has a positive input terminal connected to the reference power supply 34, and a negative input terminal connected to the node N8. The comparator 33 is configured to determine that the resonant circuit 20 is to be set to the non-resonant state when the voltage of the supply line through which the received power after rectification is supplied to the load 26 is equal to or more than a predetermined threshold value, and determine that the resonant circuit 20 is to be set to the resonant state when the voltage of the supply line is less than the predetermined threshold value. Specifically, the comparator 33 is configured to compare the voltage of the node N8 and an output voltage of the reference power supply 34 to each other and output a signal (low (L) state) for turning off the resonance control transistor 23 to a node N9 when the voltage of the node N8 is equal to or more than the output voltage of the reference power supply 34. Further, the comparator 33 is configured to output a signal (high (H) state) for turning on the resonance control transistor 23 to the node N9 when the voltage of the node N8 is less than the output voltage of the reference power supply 34.

Further, the reference power supply 34 is a constant voltage source configured to output a predetermined threshold voltage. Thus, the comparator 33 is configured to determine whether or not the resonant circuit 20 is to be set to the non-resonant state (whether or not the resonance control transistor 23 is to be turned off) based on the received power and the power consumption of the load 26 that is supplied with the received power.

The stopping circuit 35 (example of a stop control unit) is configured to control the resonance control transistor 23 so that the resonant circuit 20 is kept in the non-resonant state when the non-resonant period in which the comparator 33 continuously determines that the resonant circuit 20 is to be set to the non-resonant state is equal to or more than the predetermined period. In this case, the stopping circuit 35 is configured to output the L state to the gate terminal of the resonance control transistor 23 so that the OFF state of the resonance control transistor 23 is kept. Further, the stopping circuit 35 is configured to control the resonance control transistor 23 from a result of the determination made by the comparator 33 when the non-resonant period is less than the predetermined period. In this case, the stopping circuit 35 is configured to control the resonance control transistor 23 to any one of the ON state and the OFF state from a result of the determination made by the comparator 33. The stopping circuit 35 is configured to output the H state to the gate terminal of the resonance control transistor 23 when the resonance control transistor 23 is turned on. The details of the configuration of the stopping circuit 35 are described later.

Next, the configurations of the crest value variation detection unit 40 and the intermittent control unit 51 according to this embodiment are described with reference to FIG. 2.

Figure 2:
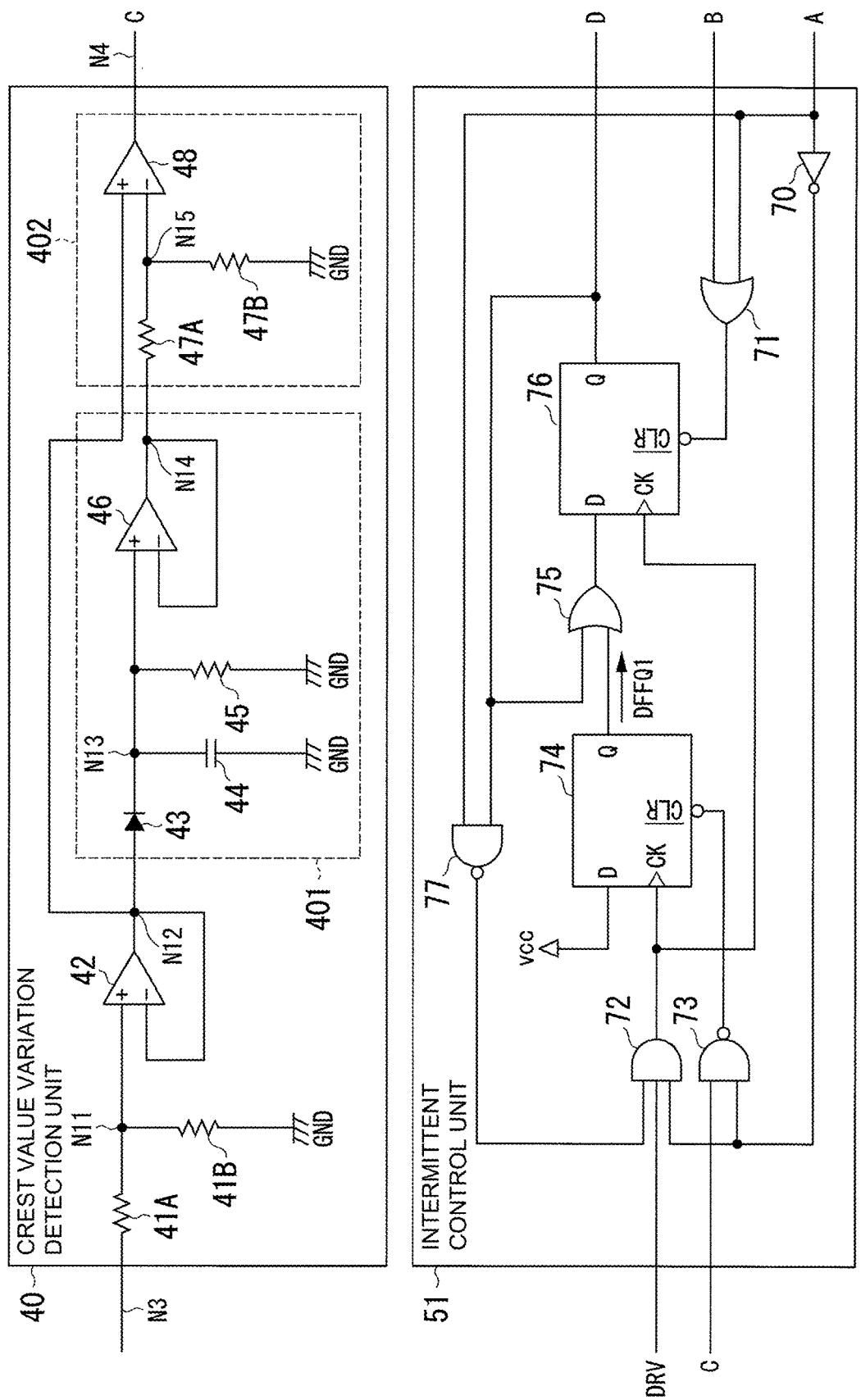
FIG. 2 is a block diagram for illustrating an example of a crest value variation detection unit and an intermittent control unit in the embodiment.

FIG. 2 is a block diagram for illustrating an example of the crest value variation detection unit 40 and the intermittent control unit 51 of this embodiment.

<Configuration of Crest Value Variation Detection Unit 40>

As illustrated in FIG. 2, the crest value variation detection unit 40 has a resistor 41A, a resistor 41B, an operational amplifier 42, a peak-hold circuit 401, and a variation detection circuit 402.

Through the resistor 41A and the resistor 41B, a voltage obtained by decreasing the voltage of the node N3 by voltage division at the ratio between resistance values of the resistor 41A and the resistor 41B is output to a node N11.

The operational amplifier 42 forms a voltage follower circuit, and is configured to output a voltage equal to the voltage of the node N11 to a node N12.

The peak-hold circuit 401 is configured to hold a peak voltage of an input voltage signal, and output the held peak voltage. In this case, the peak-hold circuit 401 holds a peak voltage of an excited voltage of the feeding coil 11 obtained by voltage division of the resistor 41A and the resistor 41B.

The peak-hold circuit 401 has a diode 43, a capacitor 44, a resistor 45, and an operational amplifier 46.

The diode 43 has an anode terminal connected to the node N12 and a cathode terminal connected to a node N13 corresponding to one terminal of the capacitor 44. The diode 43 prevents the reverse flow of current when a voltage lower than the held peak voltage is input from the node N12.

The capacitor 44 has a first terminal connected to the node N13 and a second terminal connected to the GND terminal. The capacitor 44 holds a peak voltage of the voltage signal input to the peak-hold circuit 401.

The resistor 45 has a first terminal connected to the node N13 and a second terminal connected to the GND terminal. The resistor 45 discharges the held peak voltage to initialize the peak-hold circuit 401.

The operational amplifier 46 forms a voltage follower circuit, and outputs a voltage equal to the voltage of the node N13 to a node N14.

The variation detection circuit 402 (example of a detection circuit) is configured to detect a variation in peak voltage based on the voltage held by the peak-hold circuit 401 and the peak voltage of the excited voltage. Specifically, the variation detection circuit 402 compares a voltage obtained by decreasing the output voltage of the peak-hold circuit 401 by voltage division at a predetermined resistance ratio and the input voltage of the peak-hold circuit 401 to each other, and outputs a result of the comparison to the node N4 as the detection signal C.

Further, the variation detection circuit 402 has a resistor 47A, a resistor 47B, and a comparator 48.

Through the resistor 47A and the resistor 47B, a voltage obtained by decreasing the output voltage of the peak-hold circuit 401 (voltage of the node N14) by voltage division at the ratio between resistance values of the resistor 47A and the resistor 47B is output to a node N15.

The comparator 48 has a positive input terminal connected to the node N12 and a negative input terminal connected to the node N15. The comparator 48 is configured to compare the voltage of the node N15 and the voltage input from the peak-hold circuit 401 to each other, and output a result of the comparison to the node N4 as the detection signal C. In this case, the voltage of the node N15 is a voltage obtained by decreasing the peak voltage at a predetermined ratio by the resistor 47A and the resistor 47B. When the peak voltage does not vary, the voltage of the node N12 becomes higher than the voltage of the node N15, and hence the comparator 48 outputs the H state to the detection signal C. When the peak voltage varies, the voltage of the node N12 decreases to be lower than the voltage of the node N15, and hence the comparator 48 outputs the L state to the detection signal C.

<Configuration of Intermittent Control Unit 51>

The intermittent control unit 51 has an inverter 70, an OR circuit 71, an OR circuit 75, an AND circuit 72, a NAND circuit 73, a D flip-flop (D-F/F) 74, and a D-F/F 76.

The inverter 70 is, for example, an inverting output circuit configured to output a signal obtained by logically inverting an input signal, and has an input terminal connected to a signal line of the signal A and an output terminal connected to input terminals of the AND circuit 72 and the NAND circuit 73. The inverter 70 is configured to output an inverted signal of the signal A.

The OR circuit 71 is, for example, an operational circuit configured to implement OR logical operation (logical disjunction) on two input signals, and is configured to generate a reset signal of the D-F/F 76 based on the signal A and the signal B.

The AND circuit 72 is, for example, an operational circuit configured to implement AND logical operation on two input signals, and is configured to output a clock signal of the D-F/F 74 and the D-F/F 76 based on the inverted signal of the signal A and the drive signal DRV. In this case, the drive signal DRV is input to the D-F/F 74 and the D-F/F 76 as the clock signal.

The NAND circuit 73 is, for example, an operational circuit configured to implement NAND logical operation on two input signals, and is configured to output a reset signal of the D-F/F 74 based on the inverted signal of the signal A and the detection signal C of the crest value variation detection unit 40.

The D-F/F 74 has a terminal D connected to the VCC terminal, and outputs an output signal DFFQ1 from a terminal Q to the OR circuit 75.

The OR circuit 75 implements logical disjunction on the output signal DFFQ1 of the D-F/F 74 and an output signal D of the D-F/F 76, and outputs the resultant output signal to a terminal D of the D-F/F 76.

The D-F/F 76 has the terminal D connected to an output signal line of the OR circuit 75, and outputs the drive control signal D to the AND circuit 53 and the OR circuit 75 as its output signal.

Next, the configuration of the stopping circuit 35 in this embodiment is described with reference to FIG. 3.

Figure 3:
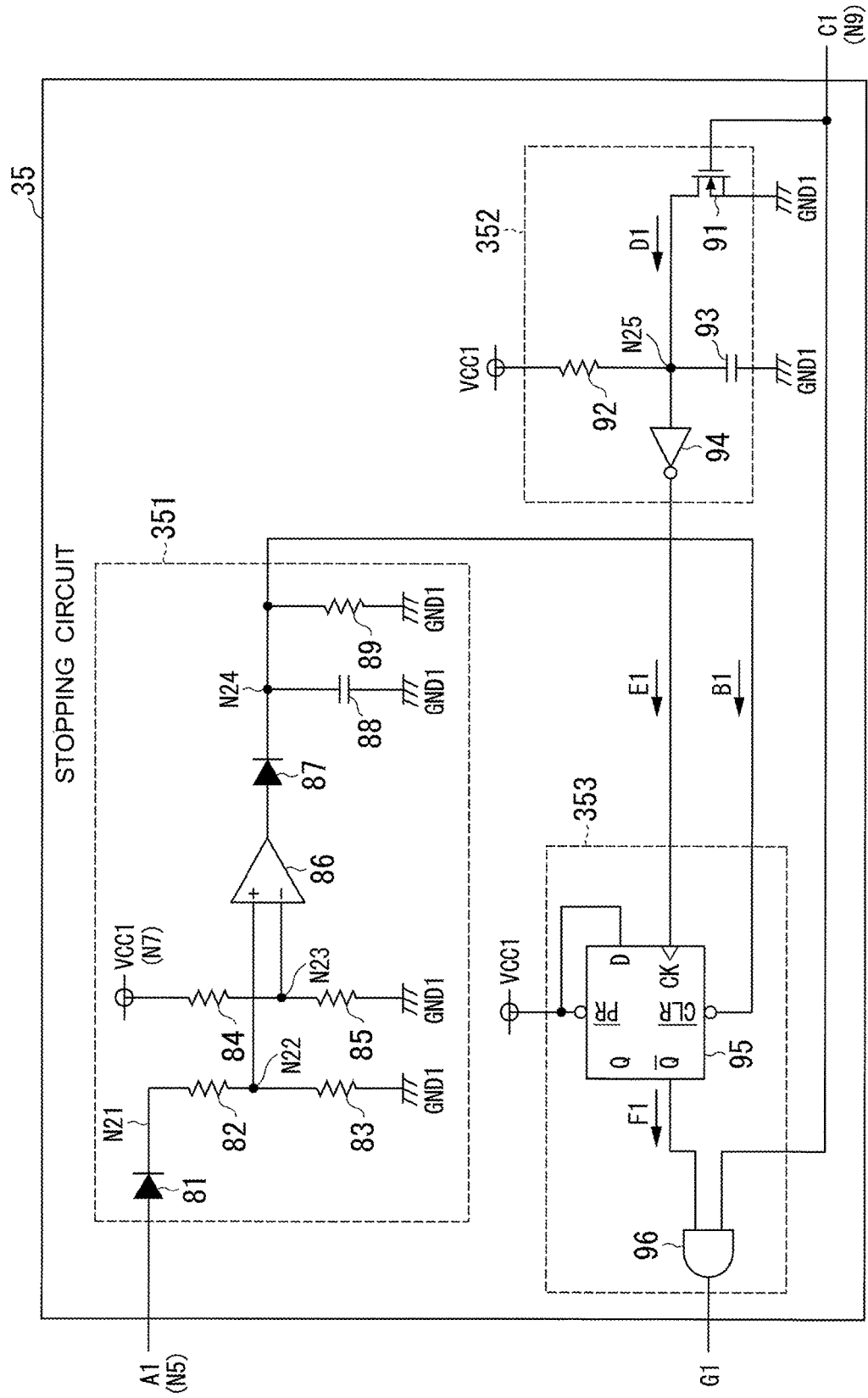
FIG. 3 is a block diagram for illustrating an example of a stopping circuit in the embodiment.

FIG. 3 is a block diagram for illustrating an example of the stopping circuit 35 in this embodiment.

<Configuration of Stopping Circuit 35>

As illustrated in FIG. 3, the stopping circuit 35 has a cancel circuit 351, a clock circuit 352, and a holding circuit 353.

The cancel circuit 351 is configured to cancel (reset) the state in which the control signal for setting the resonance control transistor 23 to the non-conductive state is output, in response to the start of the supply of the received power. The cancel circuit 351 has a peak-hold circuit. The cancel circuit 351 is configured to output the L state to a signal B1 when the receiving coil 21 is not supplied with electric power, and output the H state to the signal B1 when the receiving coil 21 is supplied with electric power. The cancel circuit 351 is configured to output the L state to the signal B1, to thereby reset a D-F/F 95 of the holding circuit 353 described later. The cancel circuit 351 has a diode 81, a resistor 82, a resistor 83, a resistor 84, a resistor 85, a comparator 86, a diode 87, a capacitor 88, and a resistor 89.

The diode 81 has an anode terminal connected to a signal line (node N5) of a signal A1, and a cathode terminal connected to a node N21. The diode 81 is configured to detect the receiving voltage of the receiving coil 21 (voltage of the node N5), and prevent a current from flowing back when the voltage of the receiving coil 21 becomes lower than a voltage of the node 21.

Through the resistor 82 and the resistor 83, a voltage obtained by decreasing the voltage (voltage of the node N21) having passed through the diode 81 by voltage division at a ratio between resistance values of the resistor 82 and the resistor 83 is output to a node N22.

Through the resistor 84 and the resistor 85 a voltage obtained by decreasing a VCC1 voltage (voltage of the node N7) by voltage division at a ratio between resistance values of the resistor 84 and the resistor 85 is output to a node N23.

The comparator 86 has a positive input terminal connected to the node N22, and a negative input terminal connected to the node N23. The comparator 86 is configured to compare the voltage of the node N22 and the voltage of the node N23 to each other and output the comparison results to an anode terminal of the diode 87. In this case, the voltage of the node N22 is a voltage obtained by decreasing the receiving voltage of the receiving coil 21 (voltage of the node N5) at a predetermined ratio with the resistor 82 and the resistor 83. The comparator 86 is configured to output the H state when the receiving coil 21 receives electric power because the voltage of the node N22 becomes higher than the voltage of the node 23. Further, the comparator 86 is configured to output the L state when the receiving coil 21 does not receive electric power because the voltage of the node N22 becomes lower than the voltage of the node N23.

The diode 87 has an anode terminal connected to an output signal line of the comparator 86, and a cathode terminal connected to a node N24 corresponding to one terminal of the capacitor 88. The diode 87 is configured to prevent a current from flowing back when a voltage lower than the held peak voltage is output from the comparator 86.

The capacitor 88 has a first terminal connected to the node N24, and a second terminal connected to the GND1 terminal. The capacitor 88 is configured to hold the peak voltage of the voltage signal input to the diode 87.

The resistor 89 has a first terminal connected to the node N22, and a second terminal connected to the GND1 terminal. The held peak voltage is discharged by the resistor 89 and the cancel circuit 351 is thus initialized.

The diode 87, the capacitor 88, and the resistor 89 form the peak-hold circuit.

The clock circuit 352 is configured to output a signal E1 (stop request signal) when the non-resonant period of the resonant circuit 20 is equal to or more than the predetermined period (for example, 200 µS (micro seconds) or more). The clock circuit 352 is configured to count, when a signal C1 being an output signal of the comparator 33 is set to the L state, a continuous period during which the signal C1 is in the L state through use of a triangular wave, for example, and output the H state to the signal E1 when the period during which the signal C1 is in the L state becomes equal to or more than a predetermined period. The clock circuit 352 has a control transistor 91, a resistor 92, a capacitor 93, and an inverter 94.

The control transistor 91 is, for example, an NMOS transistor. The control transistor 91 has a source terminal connected to the GND1 terminal, and a drain terminal connected to a signal line (node N25) of a signal D1. Further, the control transistor 91 has a gate terminal connected to an output signal line of the comparator 33 (signal line of the signal C1). The control transistor 91 is turned on to set the signal D1 to the L state when the signal C1 is set to the H state. Further, the control transistor 91 is turned off when the signal C1 is set to the L state, and the VCC1 voltage is supplied to the signal D1 through the resistor 92 described later, to thereby generate a triangular wave signal.

The resistor 92 has a first terminal connected to a VCC1 terminal, and a second terminal connected to the node N25.

The capacitor 93 has a first terminal connected to the node N25, and a second terminal connected to the GND1 terminal.

With the resistor 92 and the capacitor 93, the triangular wave signal is generated in the signal E1 when the capacitor 93 is charged with charges from the VCC1 terminal through the resistor 92.

The inverter 94 is, for example, an inverting output circuit configured to output a signal obtained by logically inverting an input signal. The inverter 94 has an input terminal connected to the signal line of the signal D1, and an output terminal connected to a signal line of the signal E1. The inverter 94 is configured to output the L state to the signal E1 when the triangular wave generated in the signal D1 reaches a threshold voltage Vth of the inverter 94. Further, the inverter 94 is configured to output the H state to the signal E1 when the control transistor 91 is turned on, and the signal D1 is set to the L state (less than the threshold voltage Vth).

The holding circuit 353 is configured to hold the state in which a control signal (signal G1) for setting the resonance control transistor 23 to the OFF state is output, in response to the signal E1 (stop request signal) output from the clock circuit 352. The holding circuit 353 has the D-F/F 95 and an AND circuit 96.

The D-F/F 95 is, for example, a D-F/F with a reset. A D terminal and a /PR (in the following description, a terminal name with an overbar is expressed by being prefixed with "/") terminal of the D-F/F 95 are connected to the VCC1 terminal, and a /Q output terminal of the D-F/F 95 is connected to an input terminal of the AND circuit 96. Further, a CK terminal of the D-F/F 95 receives the signal E1, and a /CLR terminal of the D-F/F 95 receives the signal B1. The D-F/F 95 is configured to be reset when the signal B1 is set to the L state, to thereby output the H state to the /Q output terminal (signal F1). Further, the D-F/F 95 is configured to output the L state to the /Q output terminal (signal F1) through use of rise of the signal E1 as a trigger after the signal B1 is set to the H state.

The AND circuit 96 is configured to output, as the signal G1, an output signal obtained by subjecting the signal F1 output from the D-F/F 95 and the signal C1 to an AND operation. The AND circuit 96 is configured to output the signal C1 as the signal G1, for example, when the signal F1 is in the H state. Further, the AND circuit 96 is configured to hold (fix) the output of the signal G1 to the L state, for example, when the signal F1 is in the L state.

Next, operation of the power feeding system 100 in this embodiment is described with reference to the drawings. First, operation of the power feeding device 1 is described.

Figure 4:
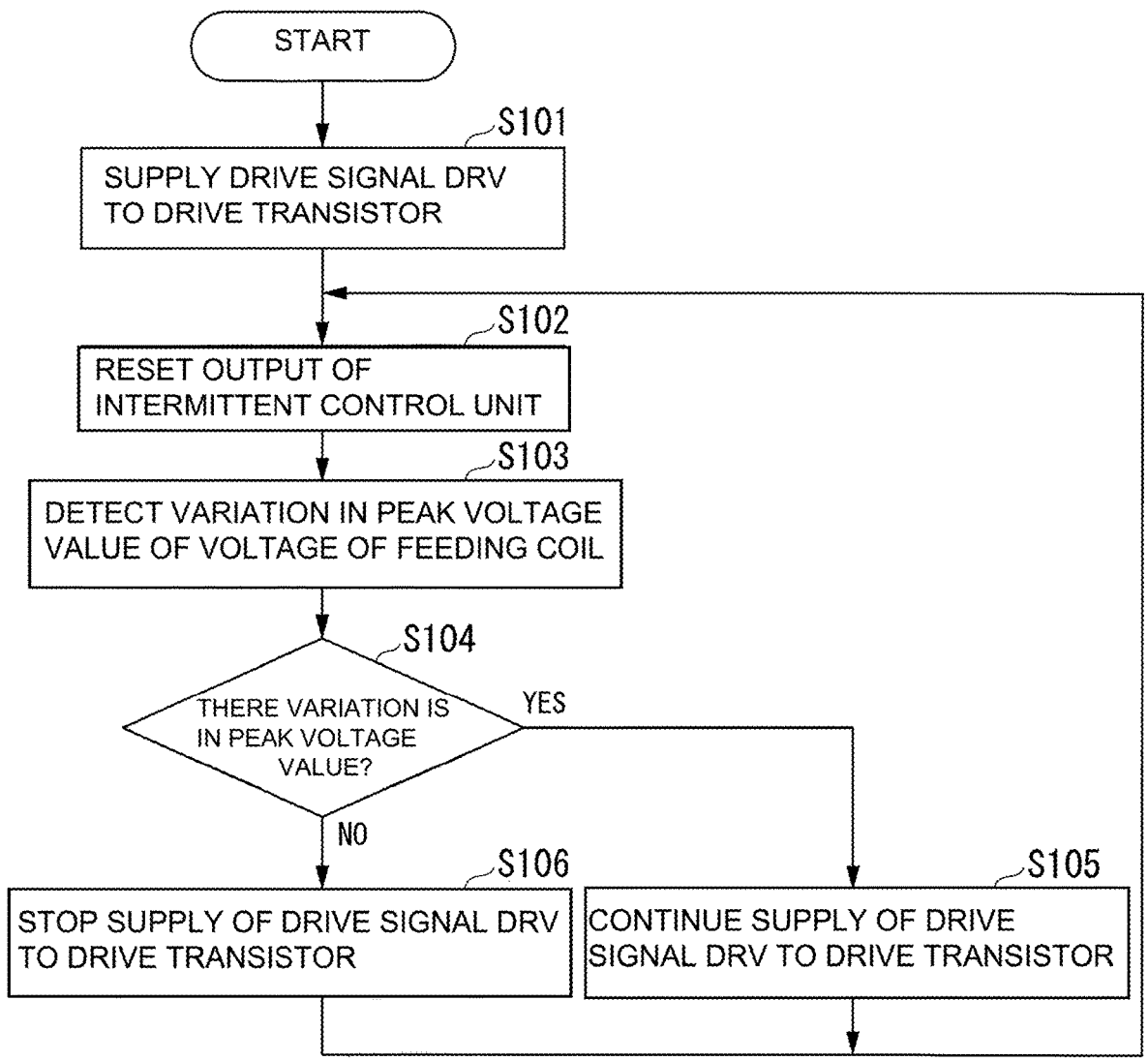
FIG. 4 is a flowchart for illustrating an example of operation of a power feeding device in the embodiment.

FIG. 4 is a flowchart for illustrating an example of the operation of the power feeding device 1 in this embodiment.

As illustrated in FIG. 4, the drive control unit 50 of the power feeding device 1 first supplies the drive signal DRV to the drive transistor 13 (Step S101). Specifically, the timing generation unit 52 of the drive control unit 50 outputs the L state to the signal A and the signal B, and the switching unit 54 is switched to the terminal-A side. In this manner, the drive signal DRV is supplied from the drive signal generation unit 14 to the gate terminal of the drive transistor 13.

Next, the drive control unit 50 resets (initializes) the drive control signal D of the intermittent control unit 51 (Step S102). Specifically, the timing generation unit 52 outputs the L state to the signal A and the signal B, to thereby reset the drive control signal D of the D-F/F 76 of the intermittent control unit 51.

Next, the crest value variation detection unit 40 of the power feeding device 1 detects a variation in peak voltage of the voltage of the feeding coil 11 (Step S103).

Next, the intermittent control unit 51 determines whether or not the peak voltage varies (Step S104). Specifically, the timing generation unit 52 sets the signal B to the H state so as to transition to the detection period, and the intermittent control unit 51 determines whether or not the peak voltage varies based on the detection signal C of the crest value variation detection unit 40.

When the peak voltage varies (Step S104: YES), the intermittent control unit 51 continues the supply of the drive signal DRV to the drive transistor 13 (Step S105). Specifically, the intermittent control unit 51 sets the drive control signal D to the H state, and the AND circuit 53 supplies the drive signal DRV to the terminal-B side of the switching unit 54. Then, the timing generation unit 52 sets the signal A to the H state to start the power supply period, and switches the input of the switching unit 54 to the terminal-B side. In this manner, the drive signal DRV is supplied to the gate terminal of the drive transistor 13 via the AND circuit 53. After the processing of Step S105, the flow returns to Step S101 after the lapse of the power supply period, and the power feeding device 1 continuously drives the feeding coil 11 as illustrated in FIG. 5.

Figure 6:
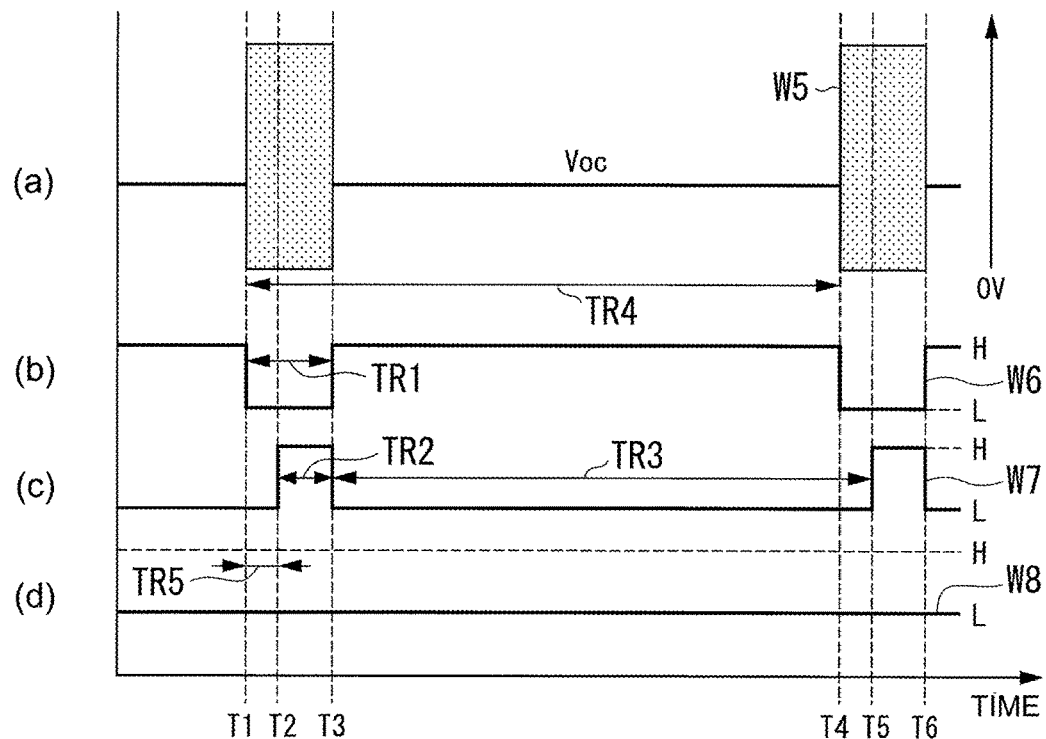
FIG. 6 is a timing chart for illustrating an example of the operation of the power feeding device when power supply to the power receiving device is not required.

When the peak voltage does not vary (Step S104: NO), the intermittent control unit 51 stops the supply of the drive signal DRV to the drive transistor 13 (Step S106). Specifically, the intermittent control unit 51 sets the drive control signal D to the L state, and the AND circuit 53 stops the supply of the drive signal DRV to the terminal-B side of the switching unit 54. Then, the timing generation unit 52 sets the signal A to the H state to start the power supply period, and switches the input of the switching unit 54 to the terminal-B side. In this manner, the supply of the drive signal DRV is stopped by the AND circuit 53, and the driving of the feeding coil 11 is stopped. After the processing of Step S106, the flow returns to Step S101 after the lapse of the power supply period, and the power feeding device 1 intermittently drives the feeding coil 11 as illustrated in FIG. 6.

Figure 5:
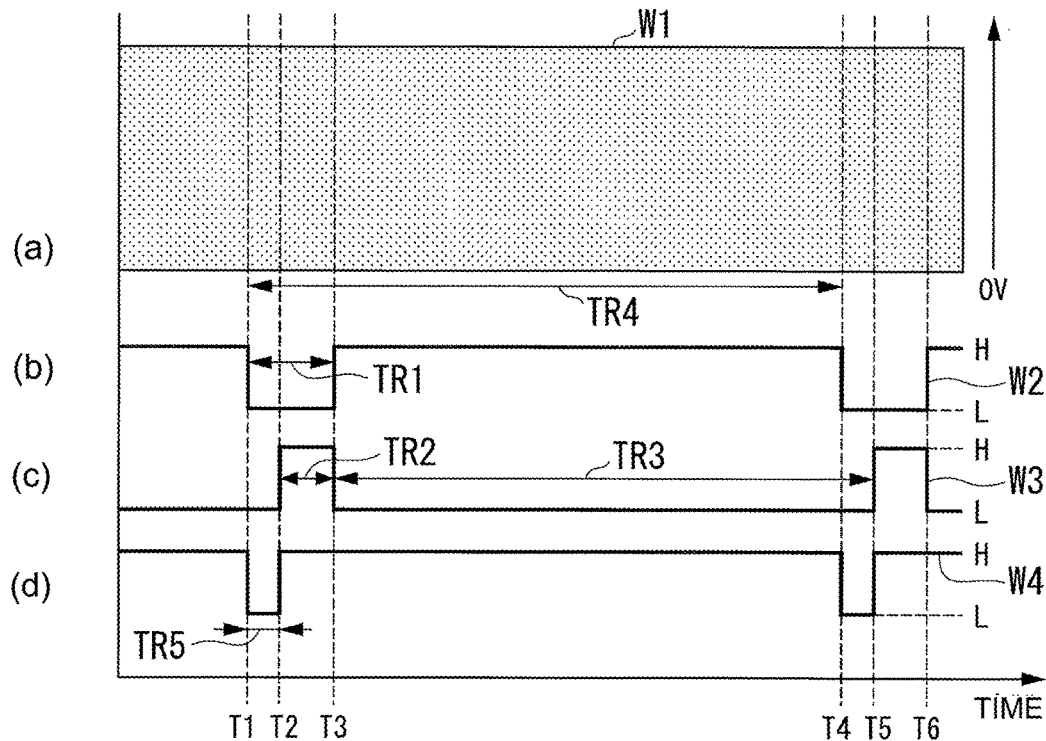
FIG. 5 is a timing chart for illustrating an example of the operation of the power feeding device when power supply to a power receiving device is required.

FIG. 5 is a first timing chart for illustrating an example of the operation of the power feeding device 1 when power supply to the power receiving device 2 is required.

In FIG. 5, waveforms W1 to W4 represent, in the order from above, the waveforms of (a) the voltage of the feeding coil 11 (voltage of the node N1), (b) the signal A, (c) the signal B, and (d) the drive control signal D. The vertical axis represents the voltage for the waveform (a) and the logic state for the waveforms (b) to (d). The horizontal axis represents time.

At a time T1 of FIG. 5, the timing generation unit 52 sets the signal A to the L state. Then, the input of the switching unit 54 is switched to the terminal-A side, and the drive control signal D being the output signal of the intermittent control unit 51 is reset.

Next, at a time T2, the timing generation unit 52 sets the signal B to the H state. Then, a detection period TR2 is started, and the intermittent control unit 51 determines whether or not the peak voltage varies based on the detection signal C of the crest value variation detection unit 40.

At a time T3, the timing generation unit 52 sets the signal A to the H state and the signal B to the L state. Then, a power supply period TR3 is started, and the input of the switching unit 54 is switched to the terminal-B side.

In the example of FIG. 5, there is illustrated the case in which power supply to the power receiving device 2 is required, and hence the supply of the drive signal DRV from the terminal-B side of the switching unit 54 is continued as indicated by the waveform W4. As a result, the power feeding device 1 performs continuous driving as indicated by the waveform W1. In this case, the power feeding device 1 is capable of supplying electric power necessary and sufficient for the charge of the load 26 to the power receiving device 2.

The operation between a time T4 to a time T6 is the same as the operation between the time T1 to the time T3. As used herein, a period TR1 represents the period during which the signal A is in the L state, and the period TR2 represents the period during which the signal B is in the H state. The period from the time T3 to the time T4 corresponds to the power supply period TR3. A period TR4 from the time T1 to the time T4 corresponds to one cycle of the timing generation unit 52. The period from the time T1 to the time T2 corresponds to a reset period TR5.

FIG. 6 is a first timing chart for illustrating an example of the operation of the power feeding device 1 when power supply to the power receiving device 2 is not required.

In FIG. 6, waveforms W5 to W8 represent, in the order from above, the waveforms of (a) the voltage of the feeding coil 11 (voltage of the node N1), (b) the signal A, (c) the signal B, and (d) the drive control signal D. The vertical axis represents the voltage for the waveform (a) and the logic state for the waveforms (b) to (d). The horizontal axis represents time.

The times T1 to T6 and the periods TR1 to TR5 of FIG. 6 are the same as those in FIG. 5.

In the example of FIG. 6, there is illustrated the case in which power supply to the power receiving device 2 is not required, and hence the drive control signal D is set to the L state as indicated by the waveform W8 to stop the supply of the drive signal DRV from the terminal-B side of the switching unit 54. As a result, the power feeding device 1 performs intermittent driving as indicated by the waveform W5. The voltage of the feeding coil 11 becomes a voltage Vcc of the VCC terminal in the period during which the supply of the drive signal DRV is stopped. In this case, the power feeding device 1 drives the feeding coil 11 only in the period TR1, and hence heat generation caused by a metallic foreign object placed on the feeding coil 11 can be suppressed. Further, the power feeding device 1 can reduce standby electric power.

The power supply period TR3 (second period) is defined to be longer than the detection period TR2 (first period) so that, for example, an increased temperature of a metallic foreign object caused by heat generation when the feeding coil 11 and the metallic foreign object are electromagnetically coupled to each other may be a predetermined temperature or less. As used herein, the predetermined temperature is, for example, a temperature within the range where the operation of the power feeding device 1 is guaranteed.

Next, the operation of the power feeding device 1 is described in detail with reference to FIG. 7 and FIG. 8.

Figure 7:
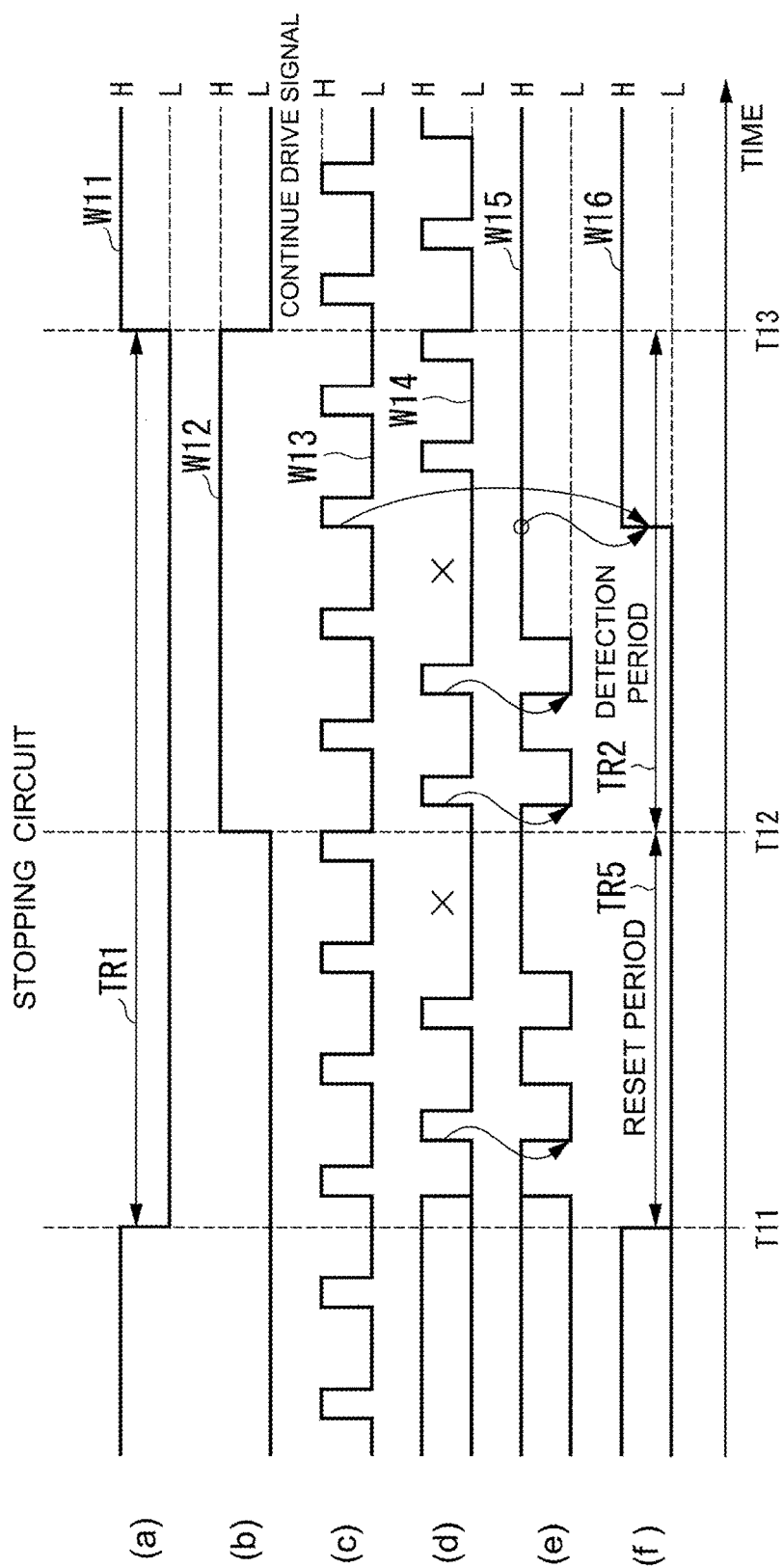
FIG. 7 is a timing chart for illustrating an example of operation of a drive control unit when power supply to the power receiving device is required.

FIG. 7 is a timing chart for illustrating an example of operation of the drive control unit 50 when power supply to the power receiving device 2 is required.

In FIG. 7, waveforms W11 to W16 represent, in the order from above, the waveforms of (a) the signal A, (b) the signal B, (c) the drive signal DRV, (d) the detection signal C, (e) the output signal DFFQ1 of the D-F/F 74, and (f) the drive control signal D. The vertical axis represents the logic state for each waveform. The horizontal axis represents time.

The period from a time T11 to a time T12 represents a reset period TR5. The period from the time T12 to a time T13 represents a detection period TR2. The period from the time T11 to the time T13 represents a period TR1 during which the signal A is in the L state.

As illustrated in FIG. 7, in the detection period TR2, the output signal DFFQ1 of the D-F/F 74 is reset in response to the rise of the detection signal C, and the output signal DFFQ1 becomes the H state in response to the rise of the drive signal DRV. When the output signal DFFQ1 is in the H state, the drive control signal D becomes the H state in response to the rise of the drive signal DRV. Accordingly, when the variation in peak voltage is detected in the detection signal C (when no pulse signal is output) in the detection period TR2, the output signal DFFQ1 of the D-F/F 74 of the intermittent control unit 51 is not reset but keeps the H state, and the drive control signal D being the output signal of the D-F/F 76 becomes the H state in response to the rise of the drive signal DRV. In this manner, the output signal of the D-F/F 76 continues to keep the H signal, and hence the drive signal DRV is continuously supplied to the drive transistor 13 even after the time T13.

In this manner, the intermittent control unit 51 has the function of holding the result of detection of the presence/absence of the variation in peak voltage, for example, even when the frequency of the variation in peak voltage is reduced to once every several tens to several hundreds of times of repeated driving of the feeding coil 11. The intermittent control unit 51 monitors the variation in peak voltage for every cycle of the drive signal DRV. Consequently, the presence/absence of the variation in peak voltage can be reliably known even when the frequency of switching of the resonant state is low.

Figure 8:
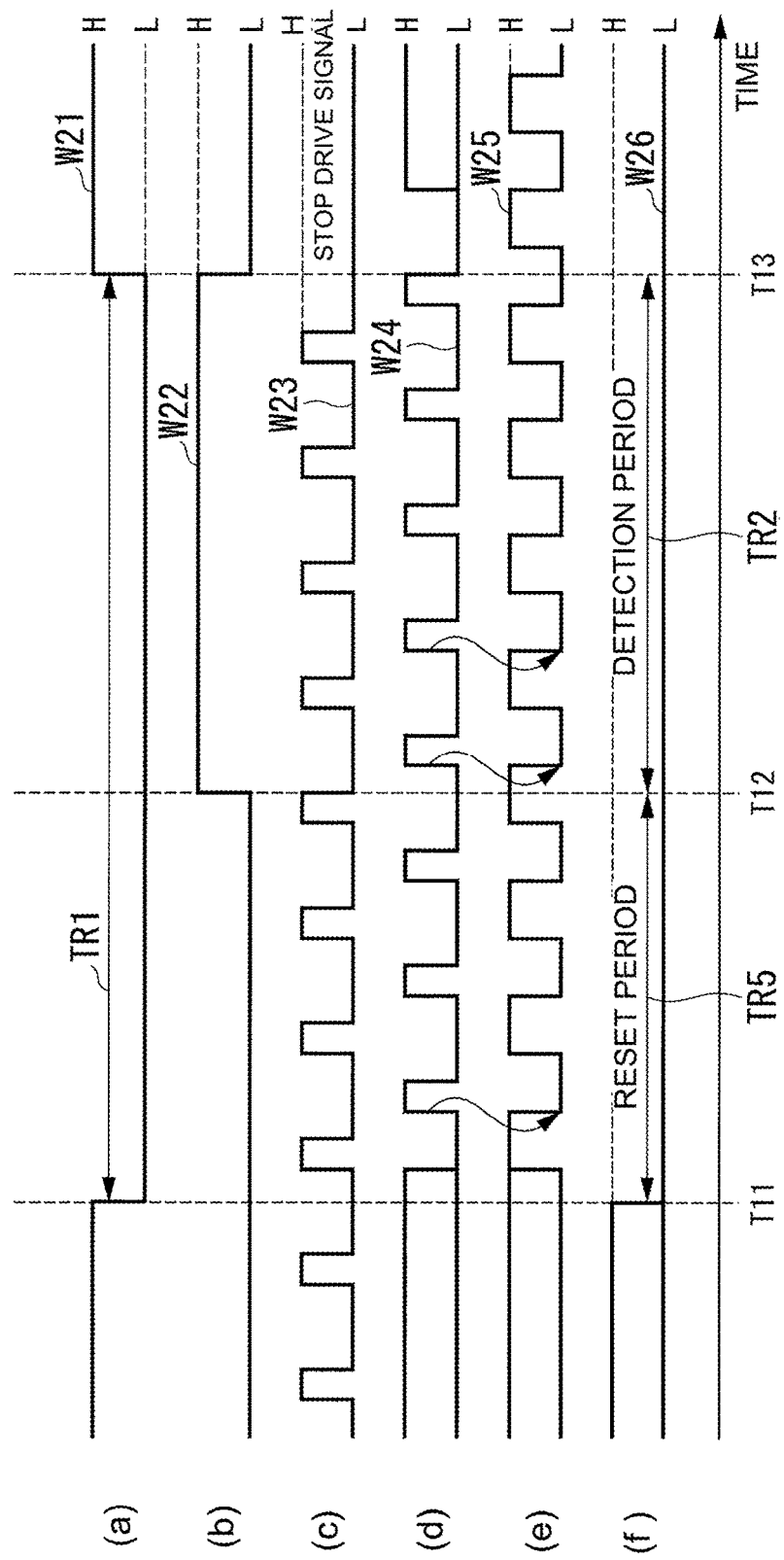
FIG. 8 is a timing chart for illustrating an example of the operation of the drive control unit when power supply to the power receiving device is not required.

FIG. 8 is a timing chart for illustrating an example of the operation of the drive control unit 50 when power supply to the power receiving device 2 is not required.

In FIG. 8, waveforms W21 to W26 represent, in the order from above, the waveforms of (a) the signal A, (b) the signal B, (c) the drive signal DRV, (d) the detection signal C, (e) the output signal DFFQ1 of the D-F/F 74, and (f) the drive control signal D. The vertical axis represents the logic state for each waveform. The horizontal axis represents time.

The period from a time T11 to a time T12 represents a reset period TR5. The period from the time T12 to a time T13 represents a detection period TR2. The period from the time T11 to the time T13 represents a period TR1 during which the signal A is in the L state.

In the example of FIG. 8, there is illustrated the case in which power supply to the power receiving device 2 is not required in the detection period TR2, and hence the crest value variation detection unit 40 does not detect a variation in peak voltage. Accordingly, the output signal DFFQ1 of the D-F/F 74 is always reset in response to the rise of the detection signal C, and the intermittent control unit 51 keeps the drive control signal D to the L state. In this manner, the supply of the drive signal DRV to the drive transistor 13 is stopped after the time T13.

Next, operation of the power receiving device 2 in this embodiment is described with reference to FIG. 9 to FIG. 11.

Figure 9:
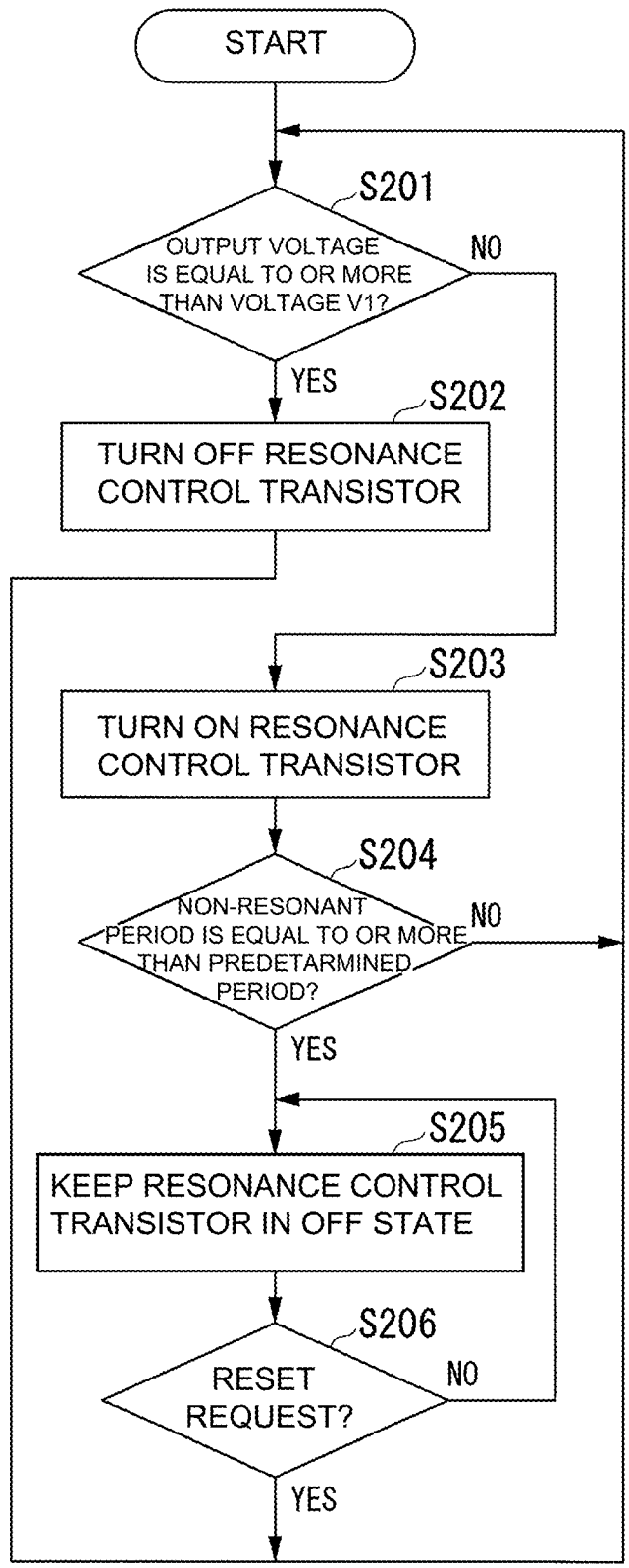
FIG. 9 is a flowchart for illustrating an example of the operation of the power feeding device in the embodiment.

FIG. 9 is a flowchart for illustrating an example of the operation of the power receiving device 2 in this embodiment.

In FIG. 9, the operation regarding the control of the resonant state of the resonant circuit 20 of the power receiving device 2 is described.

In FIG. 9, when electric power is supplied wirelessly (in a non-contact manner) from the feeding coil 11 of the power feeding device 1 to the receiving coil 21 of the power receiving device 2, the power receiving device 2 determines whether or not an output voltage (voltage of the node N7) output through the rectifying diode 24 is equal to or more than a voltage V1 (equal to or more than a predetermined threshold value) (Step S201). Specifically, the resonance control unit 30 subjects the voltage of the node N7 (output voltage) to voltage division with the resistor 31 and the resistor 32, and the comparator 33 compares the voltage subjected to voltage division (voltage of the node N8) and the output voltage of the reference power supply 34 to each other. With this, it is determined whether or not the voltage of the node N7 (output voltage) is equal to or more than the voltage V1. When electric power is supplied from the feeding coil 11 of the power feeding device 1 to the receiving coil 21 of the power receiving device 2, the stopping circuit 35 (D-F/F 95) of the resonance control unit 30 is reset.

When the voltage of the node N7 (output voltage) is equal to or more than the voltage V1 (Step S201: YES), the resonance control unit 30 advances the flow to Step S202. Further, when the voltage of the node N7 (output voltage) is less than the voltage V1 (Step S201: NO), the resonance control unit 30 advances the flow to Step S203.

In Step S202, the resonance control unit 30 turns off the resonance control transistor 23. At this time, the D-F/F 95 has been reset, and hence the stopping circuit 35 outputs, as the signal G1, the L state of the signal C1 being the output from the comparator 33 to the gate terminal of the resonance control transistor 23. After the processing in Step S202, the resonance control unit 30 returns the flow to Step S201.

In Step S203, the resonance control unit 30 turns on the resonance control transistor 23. At this time, the D-F/F 95 has been reset, and hence the stopping circuit 35 outputs, as the signal G1, the H state of the signal C1 being the output from the comparator 33 to the gate terminal of the resonance control transistor 23.

Next, the resonance control unit 30 determines whether or not the non-resonant period of the resonant circuit 20 is equal to or more than the predetermined period (Step S204). The stopping circuit 35 determines whether or not the non-resonant period of the resonant circuit 20 is equal to or more than the predetermined period, for example, through use of the clock circuit 352. When the non-resonant period of the resonant circuit 20 is equal to or more than the predetermined period (Step S204: YES), the resonance control unit 30 advances the flow to Step S205. Further, when the non-resonant period of the resonant circuit 20 is less than the predetermined period (Step S204: NO), the resonance control unit 30 returns the flow to Step S201.

In Step S205, the resonance control unit 30 keeps the resonance control transistor 23 in the OFF state. For example, with the L state output to the signal E1 when it is determined that the non-resonant period of the resonant circuit 20 is equal to or more than the predetermined period through use of the clock circuit 352, the D-F/F 95 holds the H state through use of rise of the signal E1 as a trigger to output the L state to the signal F1. With this, the output from the AND circuit 96 is fixed to the L state. As described above, the clock circuit 352 fixes the signal G1 to the L state and keeps the resonance control transistor 23 in the OFF state.

Next, the resonance control unit 30 determines whether or not there is a reset request (Step S206). The resonance control unit 30 determines whether or not there is a reset request based on the signal B1 output from the cancel circuit 351. In this case, the reset request is as follows. For example, when the supply of the received power to the receiving coil 21 is stopped, the canceling circuit 351 outputs the L state to the signal B1 to reset (cancel) the holding circuit 353. When the supply of the received power is started, the cancel circuit 351 outputs the H state to the signal B1 to cancel the reset state of the holding circuit 353. When there is a reset request (Step S206: YES), the resonance control unit 30 resets (cancels) the holding circuit 353 and returns the flow to Step S201. Further, when there is no reset request (Step S206: NO), the resonance control unit 30 returns the flow to Step S205 and keeps the resonance control transistor 23 in the OFF state.

Next, the operation of the power receiving device 2 is described in detail with reference to FIG. 10 and FIG. 11.

Figure 10:
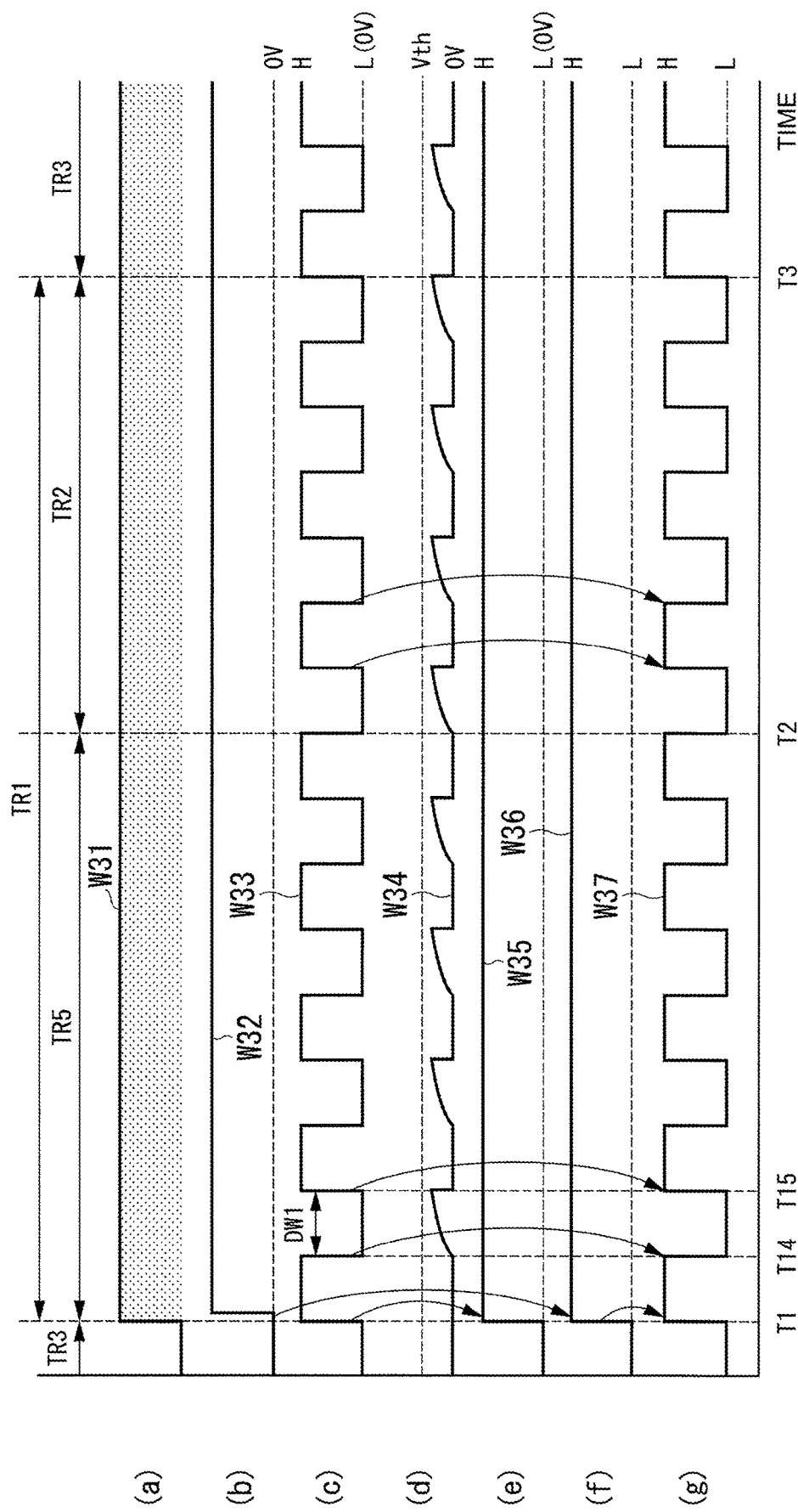
FIG. 10 is a timing chart for illustrating an example of operation of the stopping circuit when power supply to the power receiving device is required.

FIG. 10 is a timing chart for illustrating an example of the operation of the stopping circuit 35 when power supply to the power receiving device 2 is required.

In FIG. 10, waveforms W31 to W37 represent signals in the stopping circuit 35 which correspond to, in the order from above, (a) the signal A1 (voltage of the node N5), (b) the signal B1, (c) the signal C1, (d) the signal D1, (e) the signal E1, (f) the signal F1, and (g) the signal G1. The vertical axis represents the voltage for the waveforms (a), (b), and (d), and a logic state for the waveforms (c) and (e) to (g). The horizontal axis represents time.

Further, times T1 to T3, periods TR1 to TR3, and a period TR5 in FIG. 10 correspond to those in FIG. 5.

When electric power is supplied wirelessly (in a non-contact manner) from the feeding coil 11 of the power feeding device 1 to the receiving coil 21 of the power receiving device 2 at the time T1 of FIG. 10, an AC signal is supplied to the signal A1 (voltage of the node N5), and the cancel circuit 351 of the stopping circuit 35 changes the signal B1 from the L state to the H state. The D-F/F 95 of the holding circuit 353 is reset based on the period during which the signal B1 is in the L state and outputs the H state to the signal F1 (waveform W36). Further, as a result of the change of the signal B1 to the H state, the D-F/F 95 shifts to a state of being able to change the state of the signal F1 with the signal E1.

Further, the comparator 33 outputs the H state to the signal C1 at the time T1. Consequently, the clock circuit 352 outputs the H state to the signal E1, and the AND circuit 96 of the holding circuit 353 outputs the H state to the signal G1 (waveform W37). With this, the resonance control transistor 23 is turned on, and the resonant circuit 20 of the power receiving device 2 is set to the resonant state.

Next, when the comparator 33 outputs the L state to the signal C1 at a time T14 (waveform W33), the voltage of the signal D1 of the clock circuit 352 gradually increases (waveform W34). Further, as a result of the change of the signal C1 to the L state, the AND circuit 96 of the holding circuit 353 outputs the L state to the signal G1 (waveform W37). With this, the resonance control transistor 23 is turned off, and the resonant circuit 20 of the power receiving device 2 is set to the non-resonant state.

Next, when the comparator 33 outputs the H state to the signal C1 again at a time T15 (waveform W33), the control transistor 91 of the clock circuit 352 is turned on, and the voltage of the signal D1 becomes a GND1 voltage (waveform W34). In this case, a period DW1 during which the signal C1 is in the L state corresponds to the non-resonant period of the resonant circuit 20 of the power receiving device 2. The non-resonant period (period DW1) is less than the predetermined period (for example, 200 μS). The voltage of the signal D1 is therefore less than the threshold voltage Vth of the inverter 94, and the clock circuit 352 keeps the signal E1 in the H state (waveform W35). Thus, the signal F1 of the holding circuit 353 is kept in the H state (waveform W36), and the signal C1 is set to the H state, with the result that the AND circuit 96 of the holding circuit 353 outputs the H state to the signal G1 (waveform W37). With this, the resonance control transistor 23 is turned on, and the resonant circuit 20 of the power receiving device 2 is set to the resonant state.

As described above, when power supply to the power receiving device 2 is required, the non-resonant period (period DW1) becomes less than the predetermined period (for example, 200 μS) (period DW1<200 μS), and hence the stopping circuit 35 outputs the signal C1 as the signal G1, to thereby control the resonance control transistor 23.

The above-mentioned predetermined period (for example, 200 μS) is set so that the determination about whether or not the resonant circuit 20 of the power receiving device 2 is to be kept in the non-resonant state is performed within the reset period TR5 (initialization period). That is, the predetermined period (for example, 200 μS) is set to be shorter than the reset period TR5 before the detection period TR2.

In the example illustrated in FIG. 10, also in the detection period TR2 after the reset period TR5 is finished, the signal C1 periodically changes with the non-resonant period (period DW1) being less than the predetermined period (for example, 200 μS). The stopping circuit 35 therefore outputs, as the signal G1, the signal C1 to the resonance control transistor 23, to thereby control the resonance control transistor 23 so that the resonant circuit 20 is periodically switched between the resonant state and the non-resonant state. As a result, in the power feeding device 1, the crest value variation detection unit 40 detects the variation in peak voltage in the excited voltage excited in the feeding coil 11 in the detection period TR2, and the drive control unit 50 continuously supplies the drive signal DRV to the drive transistor 13 also in the power feeding period TR3 as illustrated in FIG. 5.

Figure 11:
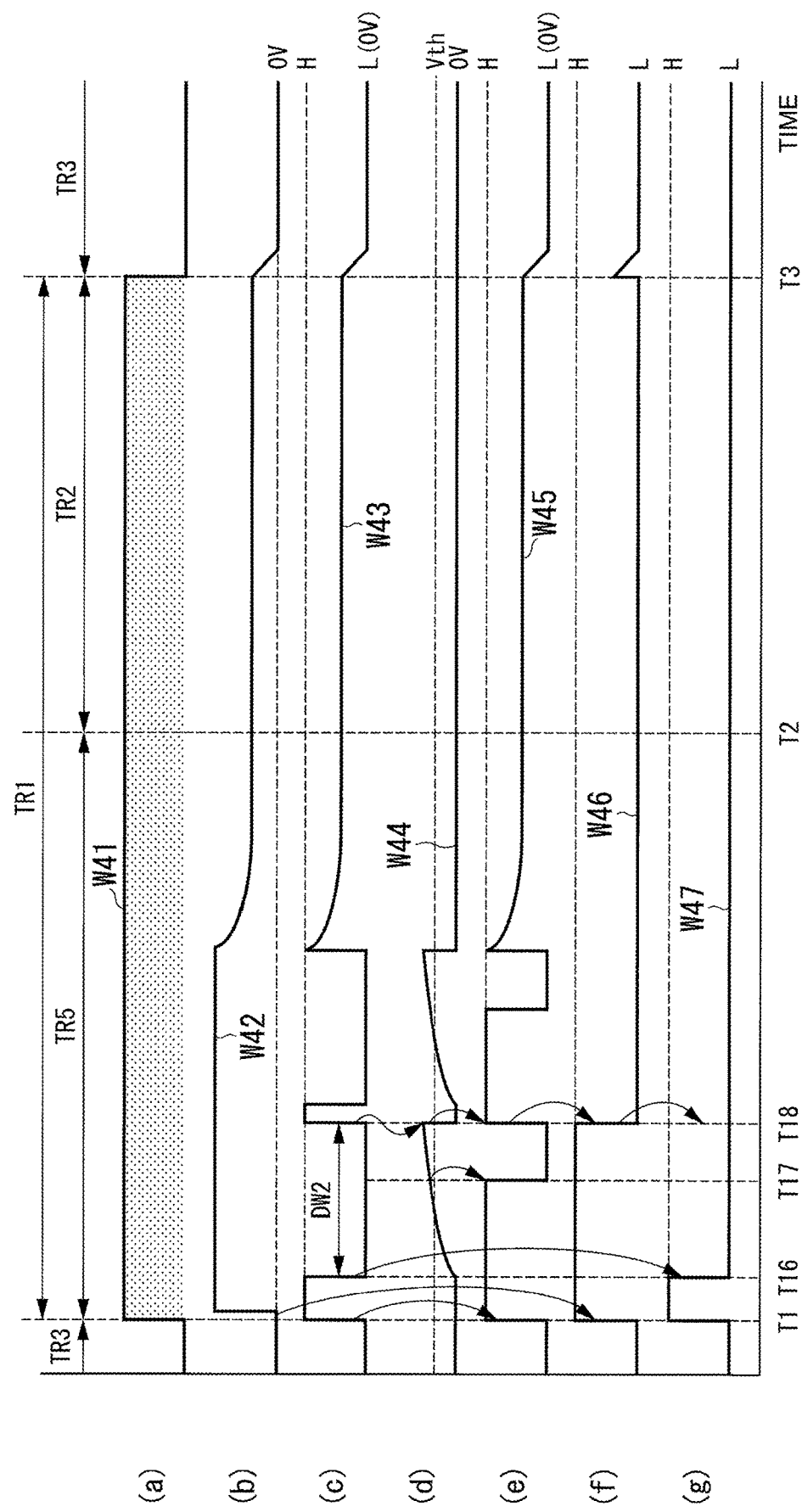
FIG. 11 is a timing chart for illustrating an example of the operation of the stopping circuit when power supply to the power receiving device is not required.

Further, FIG. 11 is a timing chart for illustrating an example of the operation of the stopping circuit 35 when power supply to the power receiving device 2 is not required.

In FIG. 11, waveforms W41 to W47 represent signals in the stopping circuit 35 which correspond to, in the order from above, (a) the signal A1 (voltage of the node N5), (b) the signal B1, (c) the signal C1, (d) the signal D1, (e) the signal E1, (f) the signal F1, and (g) the signal G1. The vertical axis is voltage for the waveforms (a), (b), and (d) and logic state for the waveforms (c) and (e) to (g). Further, the horizontal axis is time.

Further, times T1 to T3, periods TR1 to TR3, and a period TR5 in FIG. 11 correspond to those in FIG. 6.

The operation of the stopping circuit 35 at the time T1 in FIG. 11 is the same as that of FIG. 10 described above, and hence description thereof is omitted here.

Next, when the comparator 33 outputs the L state to the signal C1 at a time T16 (waveform W43), the voltage of the signal D1 of the clock circuit 352 gradually increases (waveform W44). Further, as a result of the change of the signal C1 to the L state, the AND circuit 96 of the holding circuit 353 outputs the L state to the signal G1 (waveform W47). With this, the resonance control transistor 23 is turned off, and the resonant circuit 20 of the power receiving device 2 is set to the non-resonant state.

Next, at a time T17 by which the non-resonant state continues for the predetermined period (for example, 200 μS), the voltage of the signal D1 becomes equal to or more than the threshold voltage Vth of the inverter 94, and the clock circuit 352 outputs the L state to the signal E1 (waveform W45).

Then, when the comparator 33 outputs the H state to the signal C1 again at a time T18 (waveform W43), the control transistor 91 of the clock circuit 352 is turned on, and the voltage of the signal D1 becomes the GND1 voltage (waveform W44). With this, the clock circuit 352 outputs the H state to the signal E1 (waveform W45). With rise of the signal E1, the D-F/F 95 of the holding circuit 353 outputs the L state to the signal F1 (waveform W46).

In this case, a period DW2 during which the signal C1 is in the L state corresponds to the non-resonant period of the resonant circuit 20 of the power receiving device 2. The non-resonant period (period DW2) is equal to or more than the predetermined period (for example, 200 μS), and hence the clock circuit 352 outputs a pulse signal (stop request signal) which is temporarily set to the L state, to the signal E1 (waveform W45). With the pulse signal (stop request signal), the D-F/F 95 of the holding circuit 353 outputs the L state to the signal F1 (waveform W46), and the AND circuit 96 fixes the signal G1 to the L state (waveform W47). With this, the resonance control transistor 23 is turned off, and the resonant circuit 20 of the power receiving device 2 is set to the non-resonant state.

In the example illustrated in FIG. 11, the resonant circuit 20 is kept in the non-resonant state in the detection period TR2 after the reset period TR5 is finished. As a result, in the power feeding device 1, the crest value variation detection unit 40 cannot detect the variation in peak voltage in the excited voltage excited in the feeding coil 11 in the detection period TR2, and the drive control unit 50 stops the supply of the drive signal DRV to the drive transistor 13 in the power feeding period TR3 as illustrated in FIG. 6, with the result that the power feeding device 1 is intermittently driven.

As described above, the power feeding system 100 according to this embodiment has the power feeding device 1 having the feeding coil 11, and the power receiving device 2 which has the receiving coil 21 and is connected to the load 26, and is configured to supply electric power from the power feeding device 1 to the power receiving device 2 through electromagnetic induction. The power receiving device 2 has the resonant circuit 20 and the resonance control unit 30. The resonant circuit 20 has the receiving coil 21 configured to receive electric power from the feeding coil 11, the resonant capacitor 22 configured to resonate with the receiving coil 21, and the resonance control transistor 23 (first switching element) configured to control the resonant state by changing an electrical connection state of the resonant capacitor 22. The resonance control unit 30 is configured to control the resonance control transistor 23 based on the received power by the receiving coil 21 and the power consumption of the load 26 that is supplied with the received power, and control the resonance control transistor 23 so that the resonant circuit 20 is kept in the non-resonant state when the power consumption of the load 26 becomes equal to or less than the predetermined value. The power feeding device 1 has the drive transistor 13 (second switching element) and the drive control unit 50. The drive transistor 13 is connected in series to the feeding coil 11, and is periodically switched between the ON state and the OFF state with the drive signal DRV for driving the feeding coil 11. The drive control unit 50 is configured to determine whether or not power supply to the power receiving device 2 is required based on the periodic waveform variation in the excited voltage excited in the feeding coil 11 which is detected from the change in electrical connection state of the resonant capacitor 22, and control whether or not to continue the supply of the drive signal DRV to the drive transistor 13 from a result of the determination.

With this, the power feeding system 100 according to this embodiment controls the resonance control transistor 23 so that the resonant circuit 20 of the power receiving device 2 is kept in the non-resonant state when the power consumption of the load 26 becomes equal to or less than the predetermined value. The power feeding system 100 according to this embodiment can therefore fix the resonant circuit 20 of the power receiving device 2 to the non-resonant state even when electric power supplied from the power feeding device 1 to the power receiving device 2 is decreased, for example, when the coupling coefficient between the feeding coil 11 and the receiving coil 21 is low. That is, the power feeding system 100 according to this embodiment is configured to prevent the periodic waveform variation in the excited voltage excited in the feeding coil 11 from occurring on the power receiving device 2 side in the above-mentioned case. This can reduce the risk that the power feeding device 1 erroneously determines that power supply to the power receiving device 2 is required although the power supply is not required. With this, the power feeding system 100 according to this embodiment can reduce the risk of the erroneous determination about whether or not power supply to the power receiving device 2 is required.

Further, the power feeding system 100 according to this embodiment can appropriately stop power feeding from the power feeding device 1, for example, when it is not required to supply electric power to the power receiving device 2, and hence power can be saved. That is, in the power feeding system 100 according to this embodiment, the supply of the drive signal DRV to the drive transistor 13 can be stopped even when there is no power receiving device 2, and hence standby power of the power feeding device 1 can be reduced.

Further, in this embodiment, the resonance control unit 30 has the comparator 33 (resonance determination unit) and the stopping circuit 35 (stop control unit). The comparator 33 is configured to determine whether or not the resonant circuit 20 is to be set to the non-resonant state based on the received power and the power consumption of the load 26. The stopping circuit 35 is configured to control the resonance control transistor 23 so that the resonant circuit 20 is kept in the non-resonant state when the non-resonant period in which the comparator 33 continuously determines that the resonant circuit 20 is to be set to the non-resonant state is equal to or more than the predetermined period (for example, 200 µS or more). Further, the stopping circuit 35 is configured to control the resonance control transistor 23 from a result of the determination made by the comparator 33 when the non-resonant period is less than the predetermined period.

With this, the power feeding system 100 according to this embodiment can determine that the power consumption of the load 26 becomes equal to or less than the predetermined value by a simple procedure of determining whether or not the non-resonant period is equal to or more than the predetermined period. Thus, the power feeding system 100 according to this embodiment can reduce the risk of the erroneous determination about whether or not power supply to the power receiving device 2 is required by a simple procedure.

Further, in this embodiment, the comparator 33 (resonance determination unit) is configured to determine that the resonant circuit 20 is to be set to the non-resonant state when the voltage of the supply line (for example, the node N7) through which the received power after rectification is supplied to the load 26 is equal to or more than the predetermined threshold value, and determine that the resonant circuit 20 is to be set to the resonant state when the voltage of the supply line is less than the predetermined threshold value.

With this, in the power feeding system 100 according to this embodiment, the power receiving device 2 can appropriately perform switching between the resonant state and the non-resonant state by a simple procedure.

Further, in this embodiment, the stopping circuit 35 has the clock circuit 352, the holding circuit 353, and the cancel circuit 351. The clock circuit 352 is configured to output the stop request signal (for example, the pulse signal of the signal E1) when the non-resonant period is equal to or more than the predetermined period. The holding circuit 353 is configured to hold the state in which the control signal for turning off the resonance control transistor 23 is output, in response to the stop request signal output from the clock circuit 352. The cancel circuit 351 is configured to cancel the state in which the control signal for turning off the resonance control transistor 23 is output, in response to the start of the supply of the received power.

With this, the power feeding system 100 according to this embodiment can accurately control whether or not the resonant circuit 20 is to be kept (held) in the non-resonant state depending on whether or not power supply to the power receiving device 2 is required, with simple circuit means.

Further, in this embodiment, the power feeding device 1 has the crest value variation detection unit 40 (variation detection unit) configured to detect the change in electrical connection state of the resonant capacitor 22 as the periodic waveform variation in the excited voltage excited in the feeding coil 11. The drive control unit 50 is configured to supply the drive signal DRV to the drive transistor 13 in a preset first period (for example, the detection period TR2), and cause the crest value variation detection unit 40 to detect the periodic waveform variation. When determining that power supply to the power receiving device 2 is required in the first period, the drive control unit 50 continues the supply of the drive signal DRV to the drive transistor 13 in a preset second period (for example, the power feeding period TR3) after the first period, to thereby continuously drive the feeding coil 11. Further, when determining that power supply to the power receiving device 2 is not required in the first period, the drive control unit 50 stops the supply of the drive signal DRV to the drive transistor 13 in the second period, to thereby intermittently drive the feeding coil 11. Then, the drive control unit 50 generates the first period and the second period alternately and regularly.

With this, the power feeding system 100 according to this embodiment intermittently drives the feeding coil 11, for example, when power supply to the power receiving device 2 is not required, and hence can reduce standby power of the power feeding device 1.

Further, in this embodiment, the drive control unit 50 has the initialization period (for example, the reset period TR5) for initializing the determination about whether or not power supply to the power receiving device 2 is required before the first period (for example, the detection period TR2). The predetermined period is determined so that the determination about whether or not the resonant circuit 20 of the power receiving device 2 is to be kept in the non-resonant state is performed within the initialization period.

With this, in this embodiment, the power feeding system 100 according to this embodiment can further reduce the risk of the erroneous determination about whether or not power feeding from the power feeding device 1 to the power receiving device 2 is required.

Further, in this embodiment, the periodic waveform variation has the variation in peak voltage in the excited voltage, and the drive control unit 50 is configured to determine whether or not power supply to the power receiving device 2 is required based on the variation in peak voltage in the excited voltage.

With this, the power feeding system 100 in this embodiment can detect the periodic waveform variation in the excited voltage by a simple procedure of detecting the variation in peak voltage. That is, the power feeding system 100 in this embodiment can determine whether or not power supply to the power receiving device 2 is required by a simple procedure.

Further, the power receiving device 2 according to this embodiment is configured to receive electric power from the power feeding device 1 through electromagnetic induction, and is connected to the load 26, the power feeding device 1 being configured to determine whether or not power supply to the power receiving device 2 is required based on the periodic waveform variation in the excited voltage excited in the feeding coil 11, and control whether or not to continue the supply of the drive signal DRV for driving the feeding coil 11 from a result of the determination. The power receiving device 2 has the resonant circuit 20 and the resonance control unit 30. The resonant circuit 20 has the receiving coil 21 configured to receive electric power from the feeding coil 11, the resonant capacitor 22 configured to resonate with the receiving coil 21, and a switching element configured to control the resonant state by changing the electrical connection state of the resonant capacitor 22. The resonance control unit 30 is configured to control the switching element based on the received power by the receiving coil 21 and the power consumption of the load 26 that is supplied with the received power, and control the switching element so that the resonant circuit 20 is kept in the non-resonant state when the power consumption of the load 26 becomes equal to or less than the predetermined value.

With this, the power receiving device 2 according to this embodiment exhibits the same effects as those of the power feeding system 100 described above, and can reduce the risk of the erroneous determination about whether or not power supply to the power receiving device 2 is required.

Further, a power feeding method according to this embodiment is a power feeding method for the power feeding system 100 which has the power feeding device 1 and the power receiving device 2, and is configured to supply electric power from the power feeding device 1 to the power receiving device 2 through electromagnetic inductance. The power receiving device 2 includes the resonant circuit 20, and is connected to the load 26. The power feeding device 1 includes the feeding coil 11. The power feeding method includes a drive signal supply step, a resonance control step, and a drive control step. In the drive signal supply step, the power feeding device 1 supplies the drive transistor 13 connected in series to the feeding coil 11 with the drive signal DRV for driving the feeding coil 11 by periodically switching the drive transistor 13 between the ON state and the OFF state. In the resonance control step, the power receiving device 2 controls the resonance control transistor 23 based on the received power by the receiving coil 21 and the power consumption of the load 26 that is supplied with the received power, and controls the resonance control transistor 23 so that the resonant circuit 20 is kept in the non-resonant state when the power consumption of the load 26 becomes equal to or less than the predetermined value. In the drive control step, the power feeding device 1 determines whether or not power supply to the power receiving device 2 is required based on the periodic waveform variation in the excited voltage excited in the feeding coil 11 which is detected from the change in electrical connection state of the resonant capacitor 22, and controls whether or not to continue the supply of the drive signal DRV to the drive transistor 13 from a result of the determination.

With this, the power feeding method according to this embodiment exhibits the same effects as those of the power feeding system 100 described above, and can reduce the risk of the erroneous determination about whether or not power supply to the power receiving device 2 is required.

The present invention is not limited to the above-mentioned embodiment, and may be changed within the scope not departing from the gist of the present invention.

For example, in the above-mentioned embodiment, as an example of the variation detection unit configured to detect the periodic waveform variation of the excited voltage of the feeding coil 11, description is given of the example using the crest value variation detection unit 40 configured to detect the peak voltage of the feeding coil 11. However, the present invention is not limited thereto. For example, the variation detection unit may be configured to detect the periodic waveform variation of the excited voltage of the feeding coil 11 as a variation in waveform frequency of the excited voltage or a variation in waveform cycle of the excited voltage.

Further, in the above-mentioned embodiment, as an example of the case in which power supply to the power receiving device 2 is not required (the case of the power consumption decreased state), description is given of the case in which the load 26 is a rechargeable battery, and the supply of electric power from the power feeding device 1 is no longer required due to full charging. However, the present invention is not limited thereto. The case in which power supply to the power receiving device 2 is not required (the case of the power consumption decreased state) may be, for example, a case in which power supplies of various circuits corresponding to the load 26 are turned off or a case in which the load 26 is in a low power consumption mode, for example, a power-down mode.

Further, each configuration included in the power feeding system 100 may be realized with dedicated hardware. Further, each configuration included in the power feeding system 100 may be formed of a memory and a CPU, and the function of each configuration included in the power feeding system 100 may be realized by loading a program for realizing each configuration onto the memory and executing the program.

What is claimed is:

1. A power feeding system, comprising:
   a power feeding device having a feeding coil; and
   a power receiving device having a receiving coil and is connected to a load,
   the power feeding system being configured to supply electric power from the power feeding device to the power receiving device through electromagnetic induction, the power receiving device comprising:
a resonant circuit having:
the receiving coil configured to receive the electric power from the feeding coil;
a resonant capacitor configured to resonate with the receiving coil; and
a first switching element configured to control a resonant state by changing an electrical connection state of the resonant capacitor; and
a resonance control unit configured to control the first switching element based on received power by the receiving coil and power consumption of the load to which the received power is supplied, and to control the first switching element so that the resonant circuit is kept in a non-resonant state when the power consumption of the load becomes equal to or lower than a predetermined value,
the power feeding device comprising:
a second switching element connected in series to the feeding coil and periodically switched between a conductive state and a non-conductive state with a drive signal for driving the feeding coil; and
a drive control unit configured to determine whether or not power supply to the power receiving device is required based on a periodic waveform variation in an excited voltage excited in the feeding coil which is detected from the change in electrical connection state of the resonant capacitor, and to control whether or not to continue supply of the drive signal to the second switching element;
wherein the resonance control unit comprises:
a resonance determination unit configured to determine whether or not the resonant circuit is to be set to the non-resonant state based on the received power and the power consumption of the load; and
a stop control unit configured to control the first switching element so that the resonant circuit is kept in the non-resonant state when a non-resonant period in which the resonance determination unit continuously determines that the resonant circuit is to be set to the non-resonant state is equal to or more than a predetermined period, and to control the first switching element from a result of the determination made by the resonance determination unit when the non-resonant period is less than the predetermined period.

2. The power feeding system according to claim 1, wherein the resonance determination unit is configured to determine that the resonant circuit is to be set to the non-resonant state when a voltage of a supply line through which the received power after rectification is supplied to the load is equal to or more than a predetermined threshold value, and to determine that the resonant circuit is to be set to the resonant state when the voltage of the supply line is less than the predetermined threshold value.

3. The power feeding system according to claim 1, wherein the stop control unit comprises:
a clock circuit configured to output a stop request signal when the non-resonant period is equal to or more than the predetermined period;
a holding circuit configured to hold a state in which a control signal for setting the first switching element to the non-conductive state is output, in response to the stop request signal output from the clock circuit; and
a cancel circuit configured to cancel the state in which the control signal for setting the first switching element to the non-conductive state is output, in response to a start of supply of the received power.

4. The power feeding system according to claim 1, wherein the power feeding device comprises a variation detection unit configured to detect the change in electrical connection state of the resonant capacitor as the periodic waveform variation in the excited voltage excited in the feeding coil, and
wherein the drive control unit is configured to:
supply the drive signal to the second switching element in a preset first period to cause the variation detection unit to detect the periodic waveform variation;
continue, when determining that the power supply to the power receiving device is required in the preset first period, the supply of the drive signal to the second switching element in a preset second period after the preset first period, to thereby continuously drive the feeding coil;
stop, when determining that the power supply to the power receiving device is not required in the preset first period, the drive control unit is configured to stop the supply of the drive signal to the second switching element in the preset second period, to thereby intermittently drive the feeding coil; and
generate the preset first period and the preset second period alternately and regularly.

5. The power feeding system according to claim 4, wherein the drive control unit includes, before the preset first period, an initialization period for initializing determination about whether or not the power supply to the power receiving device is required, and
wherein the predetermined period is determined so that the determination about whether or not the resonant circuit is to be kept in the non-resonant state is performed within the initialization period.

6. The power feeding system according to claim 1, wherein the periodic waveform variation includes a variation in peak voltage in the excited voltage, and
wherein the drive control unit is configured to determine whether or not the power supply to the power receiving device is required based on the variation in peak voltage in the excited voltage.

7. A power receiving device configured to receive electric power from a power feeding device through electromagnetic induction, and is connected to a load,
the power feeding device being configured to determine whether or not power supply to the power receiving device is required based on a periodic waveform variation in an excited voltage excited in a feeding coil, and to control whether or not to continue supply of a drive signal for driving the feeding coil from a result of the determination,
the power receiving device comprising:
a resonant circuit having:
a receiving coil configured to receive the electric power from the feeding coil;
a resonant capacitor configured to resonate with the receiving coil; and
a switching element configured to control a resonant state by changing an electrical connection state of the resonant capacitor; and
a resonance control unit configured to control the switching element based on received power by the receiving coil and power consumption of the load to which the received power is supplied, and to control the switching element so that the resonant circuit is kept in a non-resonant state when the power consumption of the load becomes equal to or lower than a predetermined value;

wherein the resonance control unit comprises:
- a resonance determination unit configured to determine whether or not the resonant circuit is to be set to the non-resonant state based on the received power and the power consumption of the load; and
- a stop control unit configured to control the switching element so that the resonant circuit is kept in the non-resonant state when a non-resonant period in which the resonance determination unit continuously determines that the resonant circuit is to be set to the non-resonant state is equal to or more than a predetermined period, and to control the switching element from a result of the determination made by the resonance determination unit when the non-resonant period is less than the predetermined period.

* * * * *